(12) United States Patent
Robbins et al.

(10) Patent No.: US 10,877,281 B2
(45) Date of Patent: *Dec. 29, 2020

(54) COMPACT OPTICAL SYSTEM WITH MEMS SCANNERS FOR IMAGE GENERATION AND OBJECT TRACKING

(71) Applicant: MICROSOFT TECHNOLOGY LICENSING, LLC, Redmond, WA (US)

(72) Inventors: Steven John Robbins, Redmond, WA (US); David Douglas Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,927

(22) Filed: Oct. 15, 2019

(65) Prior Publication Data
US 2020/0110268 A1 Apr. 9, 2020

Related U.S. Application Data

(63) Continuation of application No. 16/209,512, filed on Dec. 4, 2018, now abandoned, which is a continuation
(Continued)

(51) Int. Cl.
*G02B 27/01* (2006.01)
*F21V 8/00* (2006.01)
(Continued)

(52) U.S. Cl.
CPC ........ *G02B 27/0172* (2013.01); *G01S 7/4812* (2013.01); *G01S 7/4817* (2013.01); *G01S 7/499* (2013.01); *G01S 17/42* (2013.01); *G01S 17/46* (2013.01); *G01S 17/86* (2020.01); *G01S 17/87* (2013.01); *G01S 17/88* (2013.01); *G01S 17/89* (2013.01); *G02B 6/0016* (2013.01);
(Continued)

(58) Field of Classification Search
None
See application file for complete search history.

(56) References Cited

U.S. PATENT DOCUMENTS

2017/0059867 A1* 3/2017 Tanaka .............. G06K 7/10891

* cited by examiner

Primary Examiner — Christopher J Kohlman
(74) Attorney, Agent, or Firm — Newport IP, LLC; Mike R. Cicero

(57) ABSTRACT

An optical system that deploys micro electro mechanical system (MEMS) scanners to contemporaneously generate CG images and to scan a terrain of a real-world environment. An illumination engine emits a first spectral bandwidth and a second spectral bandwidth into an optical assembly along a common optical path. The optical assembly then separates the spectral bandwidth by directing the first spectral bandwidth onto an image-generation optical path and the second spectral bandwidth onto a terrain-mapping optical path. The optical system deploys the MEMS scanners to generate CG images by directing the first spectral bandwidth within the image-generation optical path and also to irradiate a terrain by directing the second spectral bandwidth within the terrain-mapping optical path. Accordingly, the disclosed system provides substantial reductions in both weight and cost for systems such as, for example, augmented reality and virtual reality systems.

20 Claims, 7 Drawing Sheets

Related U.S. Application Data of application No. 15/829,762, filed on Dec. 1, 2017, now Pat. No. 10,175,489.

(60) Provisional application No. 62/528,935, filed on Jul. 5, 2017.

(51) Int. Cl.

| | | |
|---|---|---|
| *G02B 27/10* | (2006.01) | |
| *G01S 17/89* | (2020.01) | |
| *G01S 7/481* | (2006.01) | |
| *H04N 3/08* | (2006.01) | |
| *G02B 27/28* | (2006.01) | |
| *G06F 3/01* | (2006.01) | |
| *G01S 17/87* | (2020.01) | |
| *G01S 17/46* | (2006.01) | |
| *G01S 17/42* | (2006.01) | |
| *G06K 9/00* | (2006.01) | |
| *G02B 26/10* | (2006.01) | |
| *G02B 27/00* | (2006.01) | |
| *G01S 7/499* | (2006.01) | |
| *G01S 17/88* | (2006.01) | |
| *G01S 17/86* | (2020.01) | |

(52) U.S. Cl.
CPC ....... *G02B 26/101* (2013.01); *G02B 27/0093* (2013.01); *G02B 27/0179* (2013.01); *G02B 27/1006* (2013.01); *G02B 27/283* (2013.01); *G06F 3/011* (2013.01); *G06F 3/012* (2013.01); *G06F 3/013* (2013.01); *G06F 3/017* (2013.01); *G06K 9/0061* (2013.01); *G06K 9/00671* (2013.01); *H04N 3/08* (2013.01); *G02B 2027/014* (2013.01); *G02B 2027/0134* (2013.01); *G02B 2027/0138* (2013.01); *G02B 2027/0187* (2013.01)

COMPACT OPTICAL SYSTEM WITH MEMS SCANNERS FOR IMAGE GENERATION AND OBJECT TRACKING

PRIORITY APPLICATION

This application claims the benefit of and priority to U.S. Provisional Application No. 62/528,935, filed Jul. 5, 2017, the entire contents of which are incorporated herein by reference. This application also claims the benefit of and priority to U.S. Nonprovisional application Ser. No. 15/829,762 filed Dec. 1, 2017. This application also claims the benefit of and priority to U.S. Nonprovisional application Ser. No. 16/209,512 filed Dec. 4, 2018, the entire contents of which are incorporated herein by reference.

BACKGROUND

Near-Eye-Display (NED) systems superimpose computer-generated images ("CG images") over a user's view of a real-world environment. For example, a NED system may generate composite views to enable a user to visually perceive a CG image superimposed over a visually perceived physical object that exists within the real-world environment. In some instances, a user experience is dependent on the NED system accurately identifying characteristics of the physical object and then generating the CG image in accordance with these identified characteristics. For example, suppose that the NED system is programmed to generate a user perception that a virtual gaming character is running towards and ultimately jumping over a real-world structure. To achieve this user perception, the NED system may be required to obtain detailed data defining features of a terrain around the NED.

Conventional NED systems include a range of tracking devices such as cameras and LiDAR systems that are dedicated to monitoring characteristics of a terrain or objects of a real-world environment around the NED system. Despite being beneficial to system functionalities, the added weight and bulk of such dedicated tracking systems prevents conventional NED systems from reaching a size and weight that is comfortable enough for users to readily adopt for daily use.

It is with respect to these and other considerations that the disclosure made herein is presented.

SUMMARY

Technologies described herein provide an optical system that deploys micro electro mechanical system (MEMS) scanner(s) for both generating CG images within a user's perspective of a real-world environment and also for mapping a terrain of the real-world environment and/or tracking one or more objects within the real-world environment. In some configurations, an illumination engine emits electromagnetic (EM) radiation into an optical assembly, wherein the EM radiation includes both a first spectral bandwidth for generating CG images and a second spectral bandwidth for scanning a field of view utilizing a terrain-mapping protocol. The optical assembly may cause the first spectral bandwidth and the second spectral bandwidth to propagate along a common optical path and then separate the first spectral bandwidth from the second spectral bandwidth. In particular, the optical assembly directs the first spectral bandwidth from the common optical path onto an image-generation optical path to generate CG images via a display while also directing the second spectral bandwidth from the common optical path onto a terrain-mapping optical path to scan a terrain of the real-world environment, thereby irradiating one or more objects within the real-world environment. As used herein, the term terrain-mapping refers generally to the process of scanning light over a field of view and by receiving light reflected from features of a terrain, determining terrain features of a real-world environment around the optical system. Features, characteristics and/or spatial distributions of surfaces of a terrain of a real-world environment can be scanned and data defining such features can be generated by the optical system. For example, a terrain-mapping protocol may be deployed to map features of surfaces within a room such as a piece of furniture, a table, or a couch, a structural feature of a building such as a wall or an edge of the wall, or even void spaces such as a hallway or an open doorway. In some implementations, terrain-mapping can include mapping features of a terrain within three dimensions, and generated data defining the features can be any suitable format, e.g., point-cloud data, or any other suitable 3-dimensional data representation of a real-world environment. In some implementations, terrain-mapping can include tracking one or more objects within the terrain, e.g., tracking a ball that travels across a terrain-mapping field-of-view, tracking hand gestures that can be interpreted as user commands, etc. The optical system may deploy the MEMS scanner(s) to generate CG images by directing the first spectral bandwidth within the image-generation optical path and also to irradiate the object by scanning the second spectral bandwidth within a field of view. The disclosed optical system thus eliminates the need for both a dedicated image-generation optical system and a dedicated terrain-mapping optical system within a device that requires these dual functionalities such as, for example, an NED device. Accordingly, the disclosed optical system represents a substantial advance toward producing compact and lightweight NED devices.

In an illustrative embodiment, an optical system includes at least one controller that transmits output signals to an illumination engine for modulating generation of multiple spectral bandwidths of EM radiation that is transmitted into an optical assembly. The EM radiation includes a first spectral bandwidth for generating CG images that are perceptible by a user and a second spectral bandwidth for deploying a terrain-mapping protocol to identify features of the user's real-world environment, e.g., physical objects proximate to the user and/or the optical system. It should be appreciated that in various embodiments, a terrain-mapping protocol may be deployed to map a terrain in general and/or to track a specific object of interest. A specific object of interest can be tracked, for example, to track a user's hand orientation and/or position, to track an object that a user is holding, etc. The first spectral bandwidth may include some or all of the visible-light portion of the EM spectrum whereas the second spectral bandwidth may include any portion of the EM spectrum that is suitable to deploy a desired terrain-mapping protocol. As a specific but non-limiting example, the first spectral bandwidth may span from roughly three-hundred and ninety nanometers (390 nm) to roughly seven-hundred nanometers (700 nm), while the second spectral bandwidth may be a narrower band that is centered on the eye-safe fifteen-hundred and fifty nanometers (1550 nm) wavelength. In some embodiments, the second spectral bandwidth includes at least some of the ultraviolet portion of the EM spectrum. In some embodiments, the second spectral bandwidth includes at least some of the infrared portion of the EM spectrum other than 1550 nm. These examples are provided for illustrative purposes and are not to be construed as limiting.

The optical assembly may include a common optical path on which both the first spectral bandwidth and the second spectral bandwidth propagate, e.g., when the EM radiation initially enters the optical assembly. The optical assembly further includes one or more optical elements to split the path of the first spectral bandwidth and the second spectral bandwidth, thereby directing the second spectral bandwidth onto a terrain-mapping optical path. In one example, the optical assembly includes a dielectric mirror that reflects the second spectral bandwidth from the common optical path onto the terrain-mapping optical path, and transmits the first spectral bandwidth from the common optical path onto the image-generation optical path. The foregoing description is for illustrative purposes only should not be construed as limiting of the inventive concepts disclosed herein. It should be appreciated that other techniques for separating bandwidths of light along varying optical paths may also be deployed. For example, in some embodiments, the optical assembly may separate the first spectral bandwidth from the second spectral bandwidth based on differences between respective polarization states of the spectral bandwidths.

The first spectral bandwidth that propagates along the image-generation optical path is ultimately transmitted from the optical assembly into a display component such as, for example, a waveguide display that comprises diffractive optical elements (DOEs) for directing the first spectral bandwidth. For example, the first spectral bandwidth may be transmitted into an in-coupling DOE of the waveguide display that causes the first spectral bandwidth to propagate through at least a segment of the waveguide display by total internal reflection until reaching an out-coupling DOE of the waveguide assembly that projects the first spectral bandwidth toward a user's eye. The second spectral bandwidth that propagates along the terrain-mapping optical path is ultimately emitted from the optical assembly into the real-world environment to irradiate the object for object tracking purposes (e.g., including mapping a terrain without any specific focus on and/or interest in a particular object). For example, the second spectral bandwidth may be emitted from the optical assembly to "paint" an object with a structured light pattern that may be reflected and analyzed to identify various object characteristics such as a depth of the object from the optical system, surface contours of the object, or any other desirable object characteristic. It can be appreciated that terrain mapping via structured light is a process of projecting a predetermined pattern of light (e.g., lines, grids and/or bars of light) onto a field of view or a terrain of a real-world environment. Then, based on the way that the known pattern of light deforms when striking surfaces of the terrain, the optical system can calculate other data defining depth and/or other surface features of objects stricken by the structured light. For example, the optical system may include a sensor that is offset from the optical axis along which the structured light pattern is emitted wherein the offset is configured to exacerbate deformations in the structured light patterns that are reflected back to a sensor. It can be appreciated that the degree to which the structured light pattern deforms may be based on a known displacement between the source of the structured light and a sensor that detects reflections of the structured light.

The optical system may also include one or more MEMS scanners that are configured to dynamically control various directions at which the EM radiation is reflected into the optical assembly. The MEMS scanner(s) may be configured to scan within a single direction or multiple directions (e.g., by rotating about one or more rotational-axes) to scan the first spectral bandwidth within an image-generation field-of-view (FOV) to generate the CG images via the display, and also to scan the second spectral bandwidth within the terrain-mapping FOV. In various implementations, the optical system may contemporaneously deploy the MEMS scanner(s) to direct both the first spectral bandwidth for generating CG images that are perceptible to a user and also the second spectral bandwidth for scanning a terrain, e.g., irradiating the features of the real-world environment. In some implementations, the one or more MEMS scanners may be deployed to scan light according to a fixed scanning pattern such as, for example, a fixed raster pattern. For example, the one or more MEMS scanners may include a first MEMS scanner that is configured to perform a fast scan according to a fixed raster pattern and a second MEMS scanner that is configured to perform a slow scan (which may or may not be performed according to the fixed raster pattern). The optical system may further include a sensor to detect a reflected-portion of the second spectral bandwidth that strikes one or more surfaces of the object and that is ultimately reflected back to the optical system. In particular, the sensor detects the reflected-portion and generates corresponding object data that is indicative of the various object characteristics. The at least one controller may monitor the object data generated by the sensor to determine the various object characteristics.

It should be appreciated that any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual polarizing beam splitters (PBSs) and/or wave plates and/or optical path segments may be distinguished by numerical designations without such designations corresponding to the claims or even other paragraphs of the Summary and/or Detailed Description. For example, any designation of a "first wave plate" and "second wave plate" of the optical assembly within a paragraph of this disclosure is used solely to distinguish two different wave plates of the optical assembly within that specific paragraph—not any other paragraph and particularly not the claims.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

In the figures, numerous optical path segments are illustrated between various components of the optical systems disclosed herein. Unless stated otherwise, individual optical path segments are illustrated to convey the general direction that light travels between two or more components. For example, a particular optical path segment illustrated between a first component and a second component with an arrow pointing toward the second component may generally convey that light propagates along the particular optical path segment from the first component toward the second component. However, unless clearly indicated within the Detailed Description (either explicitly or implicitly) illustrations of an individual optical path segment are not drawn to scale in terms of length, angularity, and/or position with respect to any other individual optical path segment. For example, two separate optical path segments may, in some instances, be illustrated adjacent to one another for aesthetic purposes (e.g., to separately illustrate separate paths) without indicating that these separate optical paths are in practicality adjacent (e.g., they could be on-axis, off-axis, or both).

FIG. 1 shows an example device in the form of a Near-Eye-Display (NED) device that incorporates the optical system disclosed herein.

FIGS. 2A and 2B (collectively referred to herein as FIG. 2) illustrate an exemplary embodiment of an optical system that includes an illumination engine and an optical assembly in which multiple spectral bandwidths of EM radiation propagate along a common optical path.

Figure 5A:
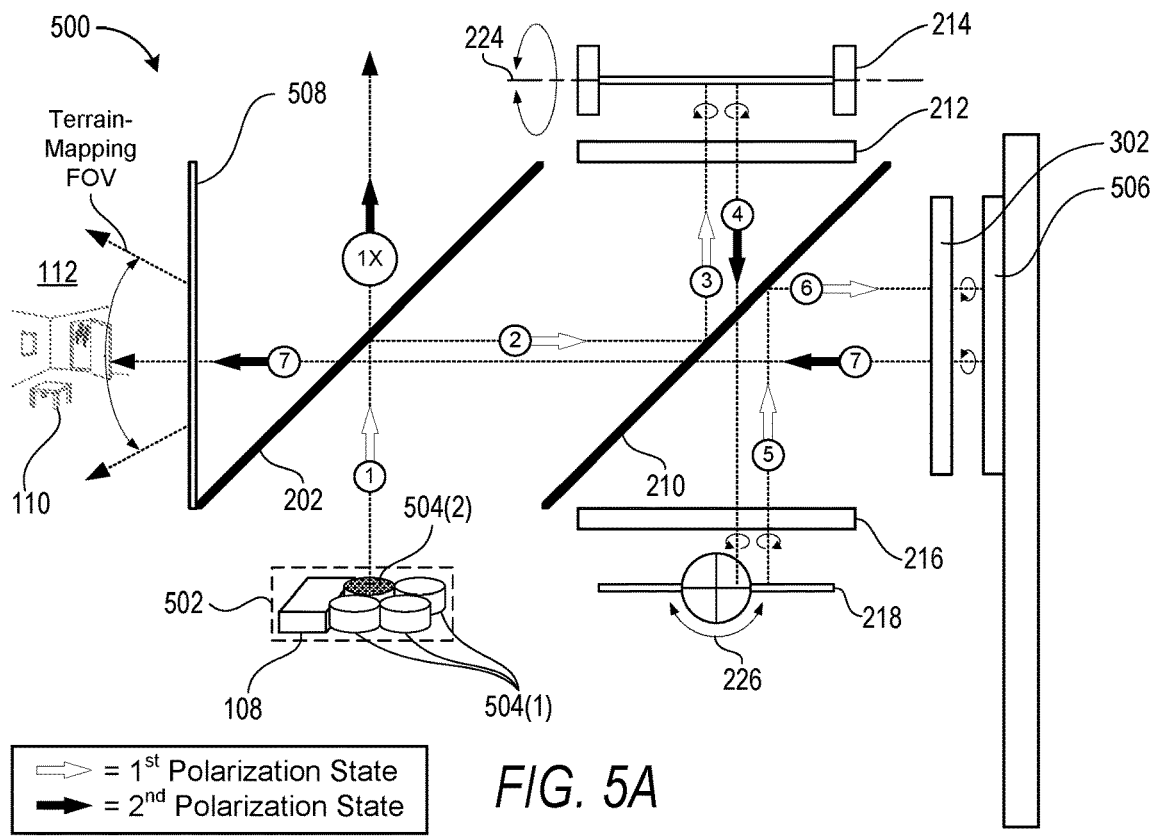
Figure 5B:
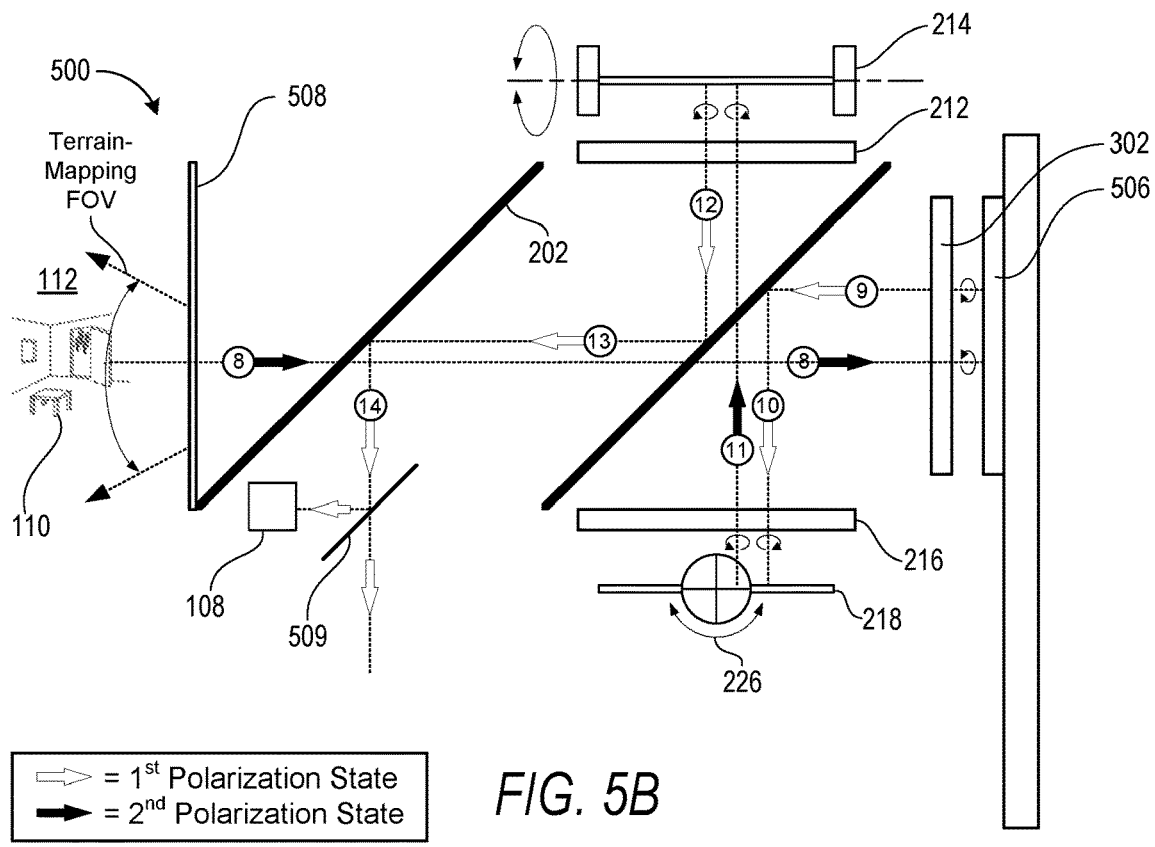

FIGS. 5A and 5B (collectively referred to herein as FIG. 5) illustrate an exemplary embodiment of an optical system that includes an illumination engine having a plurality of light sources in addition to a sensor.

Figure 6:
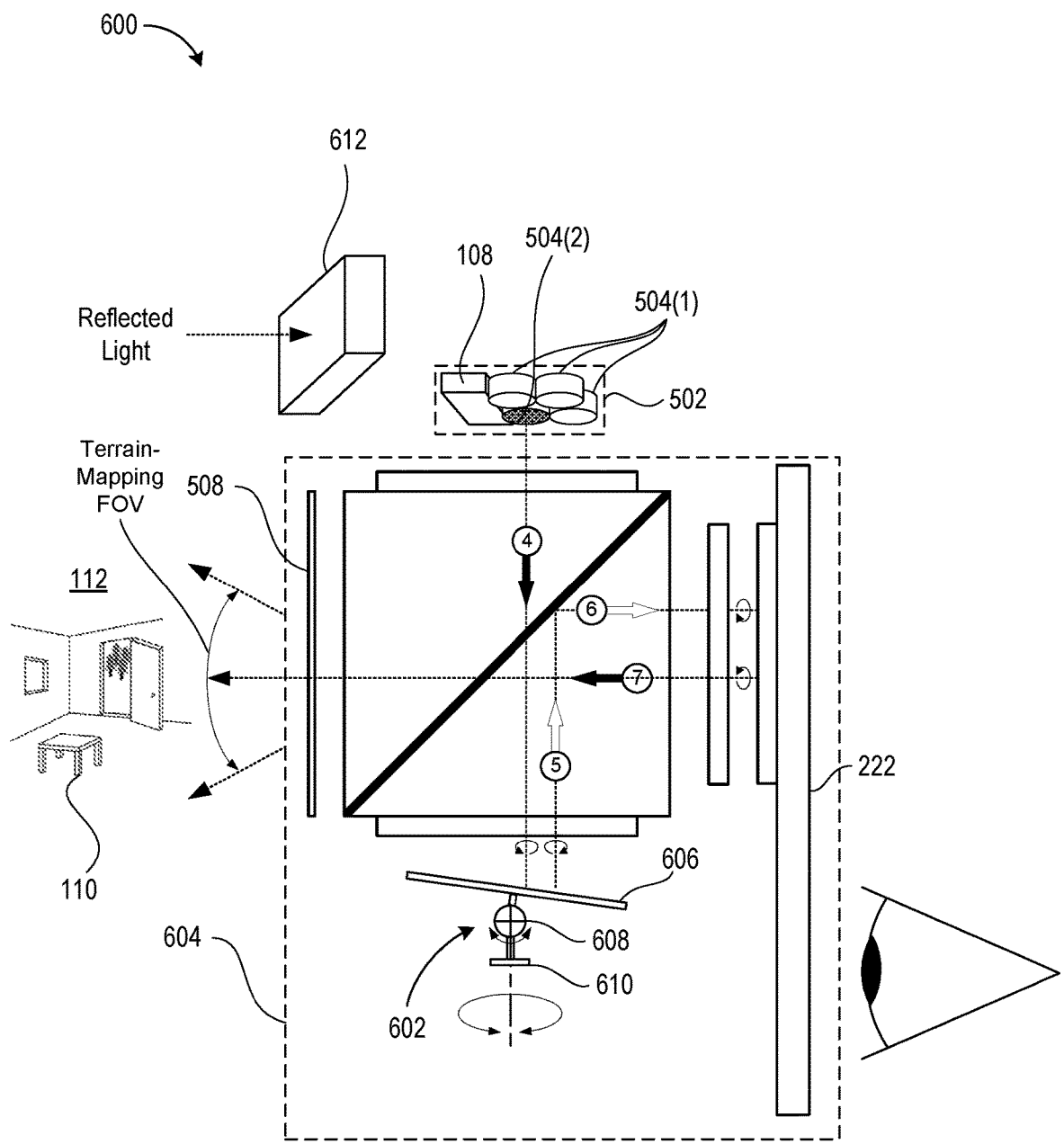

FIG. 6 illustrates an exemplary embodiment of an optical system that includes a single MEMS scanner that is configured to rotate about two different rotational-axes to scan light within two directions of a field-of-view.

Figure 7:
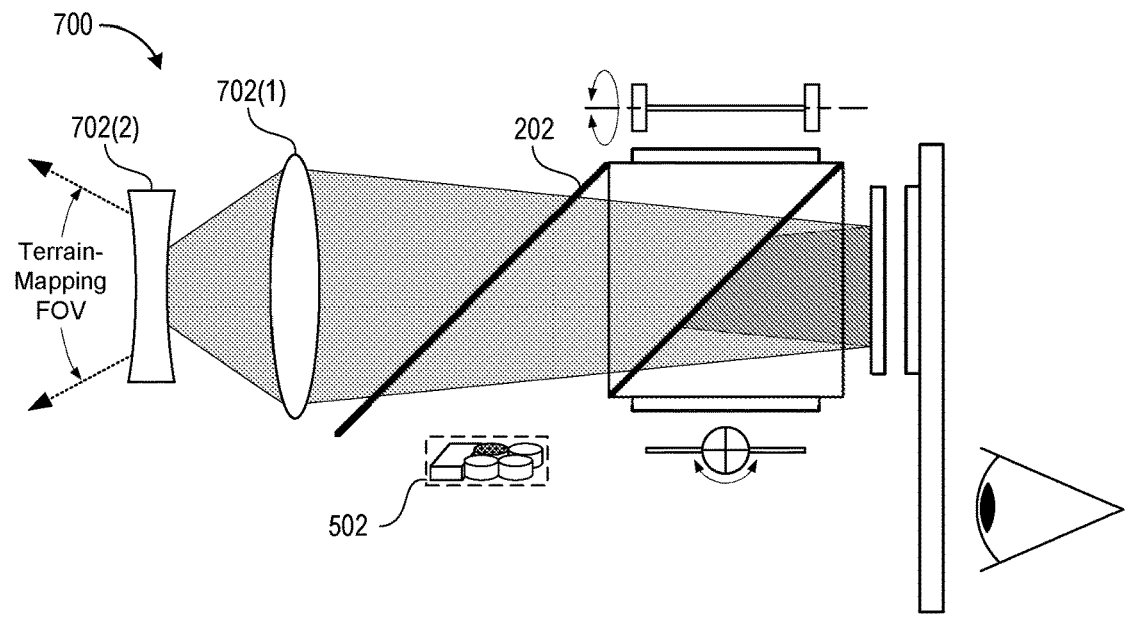

FIG. 7 illustrates an exemplary embodiment of an optical system that includes one or more lenses configured to modulate a size of a terrain-mapping field of view (FOV).

Figure 8:
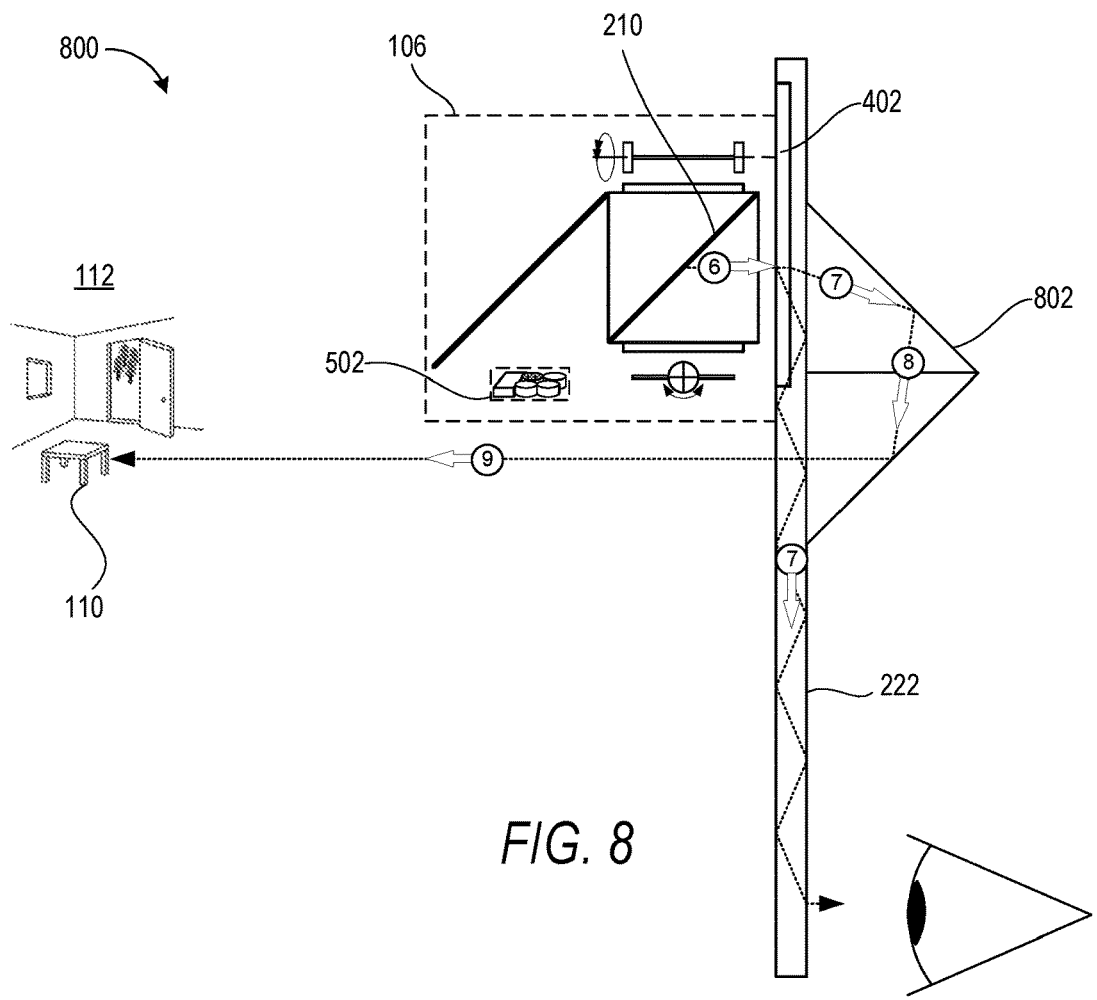

FIG. 8 illustrates an exemplary embodiment of an optical system that includes a terrain-mapping optical path that passes through a display.

Figure 9:
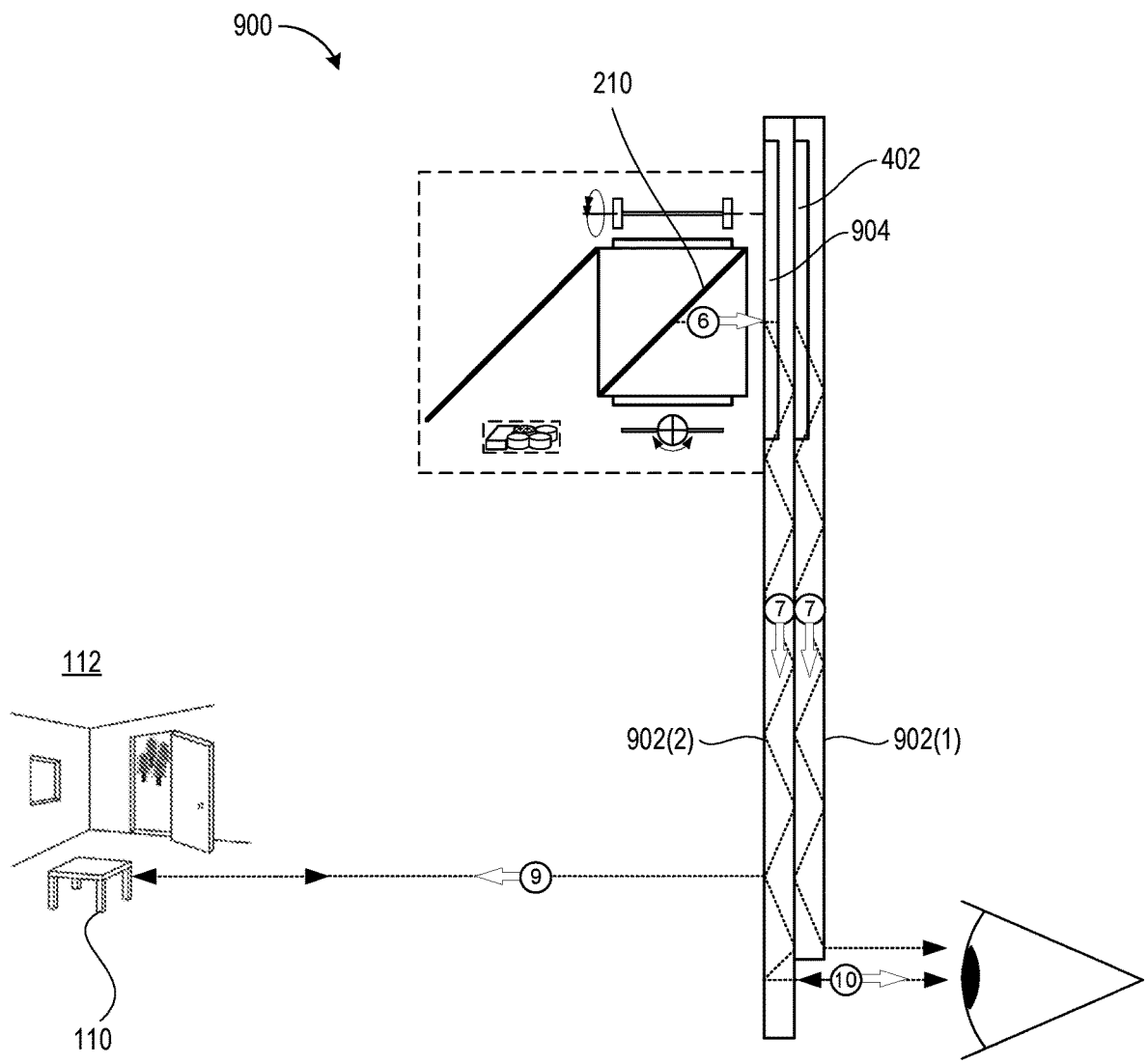

FIG. 9 illustrates an exemplary embodiment of an optical system that includes a terrain-mapping optical path that internally propagates through a waveguide prior to being emitted towards an object.

DETAILED DESCRIPTION

The following Detailed Description describes technologies for providing an optical system that deploys one or more micro electro mechanical system (MEMS) scanners for both generating computer-generated images ("CG images") within a user's perspective of a real-world environment, and mapping a terrain of the real-world environment and/or tracking an object within the real-world environment. Generally described, an illumination engine emits electromagnetic (EM) radiation that includes a first spectral bandwidth for generating the CG images and a second spectral bandwidth for deploying a terrain-mapping protocol. Both spectral bandwidths may enter an optical assembly along a common optical path. The optical assembly may then direct the first spectral bandwidth from the common optical path onto an image-generation optical path while directing the second spectral bandwidth from the common optical path onto a terrain-mapping optical path. The optical system may contemporaneously deploy the MEMS scanner(s) for both CG image-generation and terrain-mapping purposes. In particular, the MEMS scanner(s) may precisely control the directions that the first spectral bandwidth propagates along the image-generation optical path and also the directions that the second spectral bandwidth propagates along the terrain-mapping optical path.

The techniques described herein provide benefits over conventional optical systems that are dedicated to performing discrete functionalities (e.g., an optical system dedicated to performing one, but not both of, image-generation or terrain-mapping). In particular, for devices that require both image-generation and terrain-mapping capabilities, the disclosed optical system eliminates the need for both a dedicated image-generation optical system and a dedicated terrain-mapping optical system. Accordingly, the disclosed system provides substantial reductions in both weight and cost for systems such as, for example, augmented reality and virtual reality systems.

Figure 1:
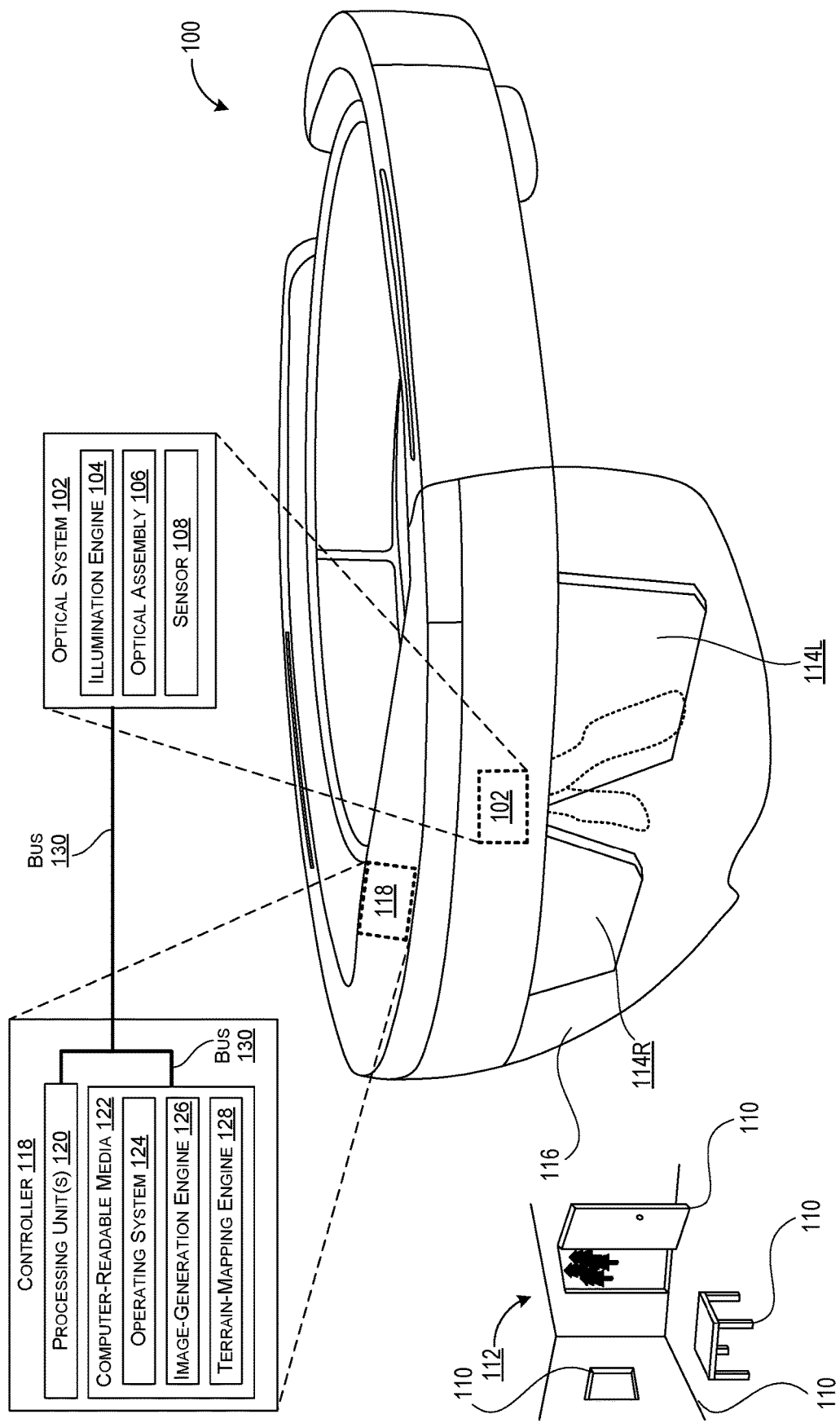

FIG. 1 shows an example device in the form of a Near-Eye-Display (NED) device 100 that may incorporate an optical system 102 as disclosed herein. In this example, the optical system 102 includes an illumination engine 104 to generate EM radiation that includes both a first spectral bandwidth for generating CG images and a second spectral bandwidth for tracking physical objects. The first spectral bandwidth may include some or all of the visible-light portion of the EM spectrum whereas the second spectral bandwidth may include any portion of the EM spectrum that is suitable to deploy a desired terrain-mapping protocol. In this example, the optical system 102 further includes an optical assembly 106 that is positioned to receive the EM radiation from the illumination engine 104 and to direct the EM radiation (or individual spectral bandwidths of thereof) along one or more predetermined optical paths. For example, the illumination engine 104 may emit the EM radiation into the optical assembly 106 along a common optical path that is shared by both the first spectral bandwidth and the second spectral bandwidth. As described in more detail elsewhere herein, the optical assembly 106 may also include one or more optical components that are configured to separate the first spectral bandwidth from the second spectral bandwidth (e.g., by causing the first and second spectral bandwidths to propagate along different image-generation and terrain-mapping optical paths, respectively). Exemplary terrain-mapping protocols include, but are not limited to, structured light protocols, time-of-flight protocols, stereo vision protocols, and any other suitable technique that can be deployed for terrain-mapping and/or object tracking purposes.

The optical assembly 106 includes one or more MEMS scanners that are configured to direct the EM radiation with respect to one or more components of the optical assembly 106 and, more specifically, to direct the first spectral bandwidth for image-generation purposes and to direct the second spectral bandwidth for terrain-mapping purposes. In this example, the optical system 102 further includes a sensor 108 to generate object data in response to a reflected-portion of the second spectral bandwidth, i.e. a portion of the second spectral bandwidth that is reflected off surfaces from a terrain, which can include surfaces of objects 110, e.g., a table, a window, a door, and edges of a wall, that exists within a scanned field of view of a real-world environment 112.

As used herein, the term "object data" refers generally to any data generated by the sensor 108 in response to the second spectral bandwidth being reflected by one or more objects within the real-world environment that surrounds the NED device 100. For example, the object data may correspond to a wall or other physical object that is of no particular interest to the NED device 100. Additionally or alternatively, the object data may correspond to a specific object that is being actively monitored by the NED device 100 (e.g., a hand of the user that is being monitored to identify hand gestures that indicate commands to be performed by the NED device 100). In the illustrated embodiment, the NED device 100 may be deployed to generate object data that represents features and/or characteristics of illustrated terrain of the real-world environment 112 that includes one or more walls defining a confined room-space, an open door through which one or more outdoor objects are visible (e.g., the illustrated trees), an object that is present within the terrain (e.g. the illustrated table), or any other physical surface and/or object that reflects light back toward the NED device 100.

In some examples, the NED device 100 may utilize the optical system 102 to generate a composite view (e.g., from a perspective of a user that is wearing the NED device 100) that includes both one or more CG images and a view of at least a portion of the real-world environment 112 that includes the object 110. For example, the optical system 102 may utilize various technologies such as, for example, augmented reality (AR) technologies to generate composite views that include CG images superimposed over a real-world view. As such, the optical system 102 may be configured to generate CG images via a display panel 114. In the illustrated example, the display panel 114 includes separate right eye and left eye transparent display panels, labeled 114R and 114L, respectively. In some examples, the display panel 114 may include a single transparent display panel that is viewable with both eyes and/or a single transparent display panel that is viewable by a single eye only. Therefore, it can be appreciated that the techniques described herein may be deployed within a single-eye Near Eye Display (NED) system (e.g. GOOGLE GLASS) and/or a dual-eye NED system (e.g. MICROSOFT HOLOLENS). The NED device 100 is an example device that is used to provide context and illustrate various features and aspects of the optical system 102 disclosed herein. Other devices and systems may also use the optical system 102 disclosed herein.

In some examples, the display panel 114 may be a waveguide display that includes one or more diffractive optical elements (DOEs) for in-coupling incident light into the waveguide, expanding the incident light in one or more directions for exit pupil expansion, and/or out-coupling the incident light out of the waveguide (e.g., toward a user's eye). In some examples, the NED device 100 may further include an additional see-through optical component 116, shown in FIG. 1 in the form of a transparent veil 116 positioned between the real-world environment 112 (which real-world environment makes up no part of the claimed invention) and the display panel 114. It can be appreciated that the transparent veil 116 may be included in the NED device 100 for purely aesthetic and/or protective purposes. The NED device 100 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

In the illustrated example, a controller 118 is operatively coupled to each of the illumination engine 104, the optical assembly 106 (and/or MEMS scanner(s) thereof) and the sensor 108. The controller 118 includes one or more logic devices and one or more computer memory devices storing instructions executable by the logic device(s) to deploy functionalities described herein with relation to the optical system 102. The controller 118 can comprise one or more processing units 120, one or more computer-readable media 122 for storing an operating system 124 and data such as, for example, image data that defines one or more CG images and/or tracking data that defines one or more terrain-mapping protocols.

In some implementations, the NED device 100 may be configured to analyze the object data to perform feature-based tracking of an orientation of the NED device 100. In some embodiments, the orientation and/or relative position of the NED device 100 with respect to one or more features of a terrain may be measured in terms of degrees of freedom such as, for example, rotation about a plurality of axis (e.g., yaw, pith, and/or roll). For example, in a scenario in which the object data includes an indication of a stationary object within the real-world environment (e.g., a table), the NED device may monitor a position of the stationary object within a terrain-mapping field-of-view (FOV). Then, based on changes in the position of the table within the terrain-mapping FOV and a depth of the table from the NED device, the NED device may calculate changes in the orientation and position of the NED device 100. It can be appreciated that these feature-based tracking techniques may be used to monitor changes in the orientation and position of the NED device for the purpose of monitoring an orientation of a user's head (e.g., under the presumption that the NED device is being properly worn by a user). Although it can be appreciated that in some embodiments the various MEMS scanner related techniques described herein may be deployed to determine a depth(s) for feature based tracking, in other implementations depth(s) can be determined using alternate techniques. Furthermore, in some implementations, the NED device 100 may include an Inertial Measurement Unit (IMU) to augment position and/or orientation solutions calculated vie feature based tracking.

The computer-readable media 122 may further include an image-generation engine 126 that generates output signals to modulate generation of the first spectral bandwidth of EM radiation by the illumination engine 104 and also to control the MEMS scanner(s) to direct the first spectral bandwidth within the optical assembly 106. Ultimately, the MEMS scanner(s) direct the first spectral bandwidth through the display panel 114 to generate CG images that are perceptible to a user. The computer-readable media 122 may further include a terrain-mapping engine 128 that generates output signals to modulate generation of the second spectral bandwidth of EM radiation by the illumination engine 104 and also the MEMS scanner(s) to direct the second spectral bandwidth along a terrain-mapping optical path to irradiate the object 110. The terrain-mapping engine 128 communicates with the sensor 108 to receive the object data that is generated based on the reflected-portion of the second spectral bandwidth. The terrain-mapping engine 128 then analyzes the object data to determine one or more features or characteristics of the object 110 or a terrain such as, for example, a depth of the object 110 with respect to the optical system 102, an orientation of the object 110 with respect to the optical system 102, a velocity and/or acceleration of the object 110 with respect to the optical system 102, or any other desired characteristic of the object 110. The components of the NED device 100 are operatively connected, for example, via a bus 130, which can include one or more of a system bus, a data bus, an address bus, a PCI bus, a Mini-PCI bus, and any variety of local, peripheral, and/or independent buses.

A terrain can be scanned by one or more devices disclosed herein and data defining features of the terrain can be generated. For instance, one or more devices can identify a texture of a surface within a terrain, identify a wall or any other object within the terrain. In other non-limiting examples, one or more devices disclosed herein can identify edges of one or more objects, such as walls, tables, etc.

In some implementations, the NED device 100 includes multiple discrete channels that are independently deployed to perform different terrain-mapping and/or object-tracking functions. In one specific but non-limiting example, the NED device 100 includes a first channel corresponding to the right eye display panel 114R and a second channel corresponding to the left eye display panel 114L. In this example, the first channel can be deployed to perform terrain-mapping of the real-world environment 112 while the second channel is deployed to perform object-tracking of one or more specific objects of interest (e.g., a hand of a user, a car traveling in front of the user, etc.). For example, the first channel can emit the second spectral bandwidth within a field-of-view (FOV) for far-field terrain mapping while the second channel can emit the second spectral bandwidth from a different FOV for near-field hand-gesture tracking. It will become apparent from the following description that in multichannel implementations, each discrete channel of the NED device 100 may include a corresponding optical system as described in relation to FIGS. 2A through 9 (e.g., optical systems 200 through 700).

The processing unit(s) 120, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 122, can store instructions executable by the processing unit(s) 120. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 2A:
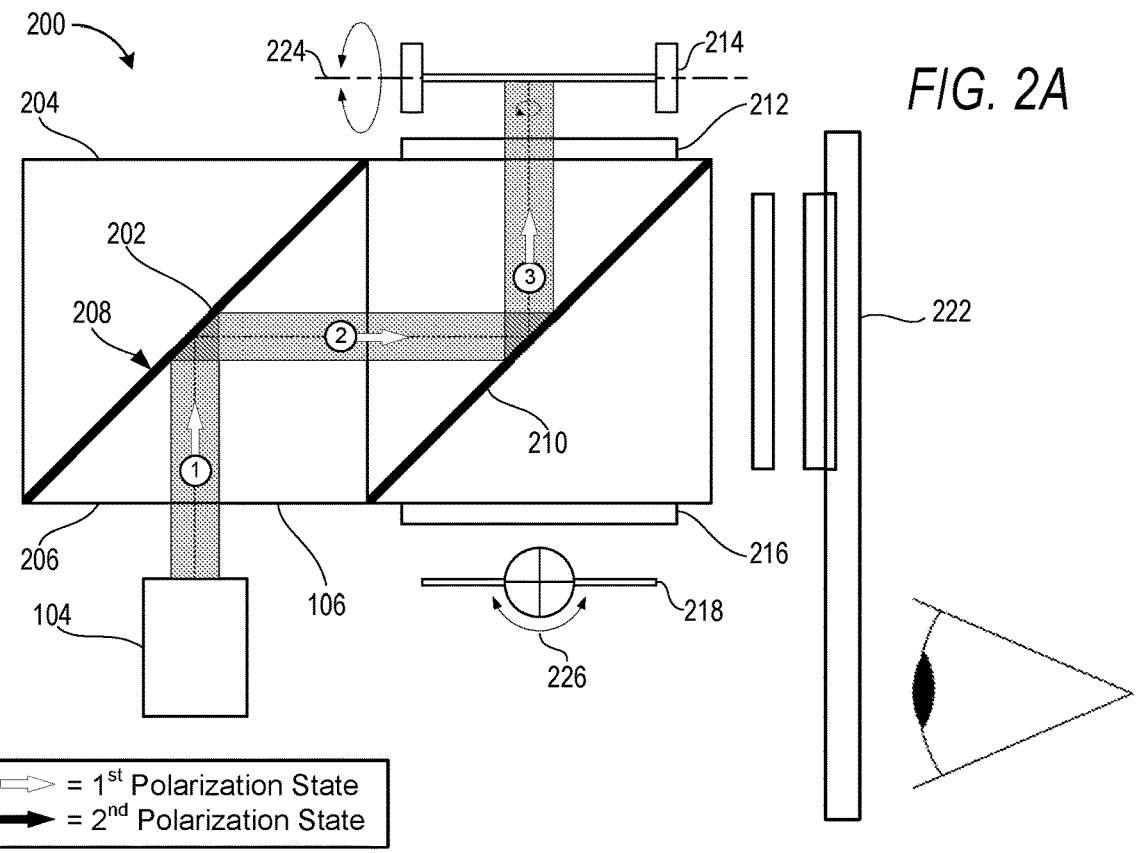
Figure 2B:
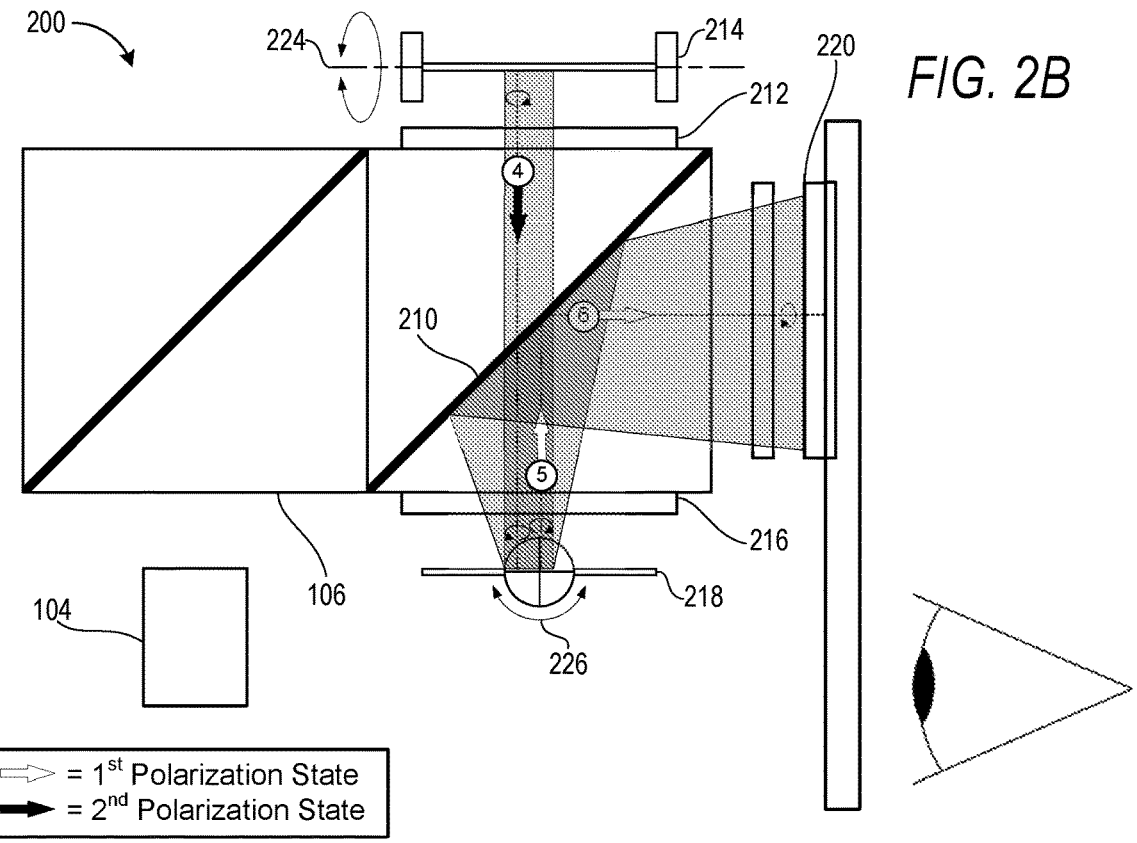

Turning now to FIGS. 2A and 2B (collectively referred to herein as FIG. 2), an exemplary embodiment of an optical system 200 is illustrated that includes an illumination engine 104 and an optical assembly 106 in which multiple spectral bandwidths of EM radiation (e.g., a first spectral bandwidth and a second spectral bandwidth) propagate along a common optical path. In the illustrated examples, the common optical path includes six individually numbered optical path segments.

As illustrated, the illumination engine 104 emits EM radiation into the optical assembly 106 along a first optical path segment toward a first polarizing beam splitter (PBS) 202 that is configured to reflect linearly polarized light in a first polarization state and transmit linearly polarized light in a second polarization state that is orthogonal to the first polarization state. For example, the first polarization state may be S-Polarized and the second polarization state may be P-Polarized. In some embodiments, the illumination engine 104 may be configured to emit the EM radiation in the first polarization state. An exemplary PBS 202 may include a PBS cube that comprises two right angle prisms 204 and 206 which are joined at a planar face 208. Other beam splitting devices may be alternatively utilized including, for example, plate beam splitters, wire grid beam splitters, diffraction grating beam splitters, and/or any other type of suitable beam splitter.

In the illustrated example, at least some of the EM radiation is in the first polarization state while propagating along the first optical path segment. As a result, the PBS 202 reflects the EM radiation (or the portion that is in the first polarization state) onto a second optical path segment toward a second PBS 210. The second PBS 210 is similarly configured to reflect linearly polarized light in the first polarization state and to transmit linearly polarized light in the second polarization state that is orthogonal to the first polarization state. Since the EM radiation along the second optical path segment remains in the first polarization state, the second PBS 210 reflects the EM radiation onto a third optical path segment in the first polarization state.

While propagating along the third optical path segment, the EM radiation passes through a first wave plate 212 such as, for example, a quarter wave plate comprising a slab of birefringent material having a predetermined thickness. Wave plates may also be referred to herein as optical retarders. In some embodiments, the first wave plate 212 may be configured to alter the polarization of the EM radiation as it passes through the first wave plate 212 toward a first MEMS scanner 214. The first MEMS scanner 214 is configured to reflect the EM radiation back towards the first wave plate 212. Then, upon passing through the first wave plate 212 for a second time (e.g., on its way back toward the PBS 210), the EM radiation may be altered into the second polarization state. The EM radiation that is altered in the second polarization state can be transmitted through the first PBS 202 and the second PBS 210.

In some embodiments, the EM radiation initially strikes the first wave plate 212 as it propagates towards the first MEMS scanner 214 in a first linearly polarized state and is changed by the first wave plate 212 to a circularly polarized state upon exiting the first wave plate 212. This circularly polarized state is represented in FIG. 2A by the circular arrow symbol surrounding the third optical path segment between the first MEMS 214 and the first wave plate 212. Now referring specifically to FIG. 2B, when the EM radiation impinges upon a reflective surface of the first MEMS scanner 214 (e.g., a reflective scanning plate) in the circularly polarized state, it is then reflected onto the fourth optical path segment in a backward propagating circularly polarized state back towards the first wave plate 212. This backward propagating circularly polarized state is represented in FIG. 2B by the circular arrow symbol surrounding the fourth optical path segment between the first MEMS 214 and the first wave plate 212.

The EM radiation then impinges upon the first wave plate 212 in the backward propagating circularly polarized state where it is altered into the second polarization state that is able to pass through the PBS 210. Stated alternatively, the EM radiation exits the front face (i.e., the face that is closest to the PBS 210) of the first wave plate 212 in an opposite polarization state as compared to when the EM radiation impinged upon the front face of the first wave plate 212. In one example, the EM radiation may be P-Polarized upon exiting the first wave plate 212 on the fourth optical path segment as a result of having made two passes through the wave plate—one pass in the forward propagating direction and another pass in the backward propagating direction—after having initially impinged upon the first wave plate 212 on the third optical path segment while S-Polarized.

While propagating along the fourth optical path segment in the second polarization state, the EM radiation passes through the PBS 210 prior to passing through a second wave plate 216 toward a second MEMS scanner 218. The second wave plate 216 may be configured similarly to the first wave plate 212 so that two passes through the second wave plate 216 change a polarization state of a linearly polarized beam of EM radiation that initially impinges upon the second wave plate 216 (e.g., along the fourth optical path segment) to the orthogonal state polarization upon exiting the second wave plate 216 (e.g., along the fifth optical path segment). For example, the two passes through the second wave plate 216 change the EM radiation from S-Polarized to P-Polarized, or vice versa. Since the EM radiation along the fifth optical path segment has been converted back into the first polarization state, the PBS 210 reflects the EM radiation onto a sixth optical path segment toward one or more optical components 220 that are configured to separate the first spectral bandwidth from the second spectral bandwidth. It can be appreciated that in the illustrated example, the combination of the first optical path segment through the sixth optical path segment forms a common optical path along which both the first spectral bandwidth and the second spectral bandwidth propagate.

In the illustrated example, the first MEMS scanner 214 and the second MEMS scanner 218 each include a corresponding scanning plate having a reflective surface (e.g., a mirror) that is used to scan an impinging beam of EM radiation within an image-generation field of view (FOV) of a display 222 (e.g., a waveguide display) and/or a terrain-mapping FOV of the real-world environment 112. The reflective surface may include a plated reflective metal such as gold or aluminum, a dielectric stack, bear silicone, or other materials depending upon wavelength and other design criteria. The scanning plate may be configured with a rectangular footprint, a circular footprint, an oval footprint, or any other suitable footprint as dictated by design criteria. As used herein, an image-generation FOV refers to a portion of the display 222 that is both visible to a user when the optical system 200 is being properly operated and that is configured to emit or otherwise display the first spectral bandwidth of EM radiation to the user. As used herein, a terrain-mapping FOV refers to a portion of the real-world environment 112, with respect to a current orientation of the optical system 200, that the optical assembly 106 is configured to emit the second spectral bandwidth of EM radiation within for terrain-mapping purposes.

In the illustrated example, the first MEMS scanner 214 is configured to rotate its respective scanning plate about a first rotational-axis 224 whereas the second MEMS scanner 218 is configured to rotate its respective scanning plate about a second rotational-axis 226. In some embodiments, the first rotational-axis 224 may be perpendicular to the second rotational-axis 226 such that the first MEMS scanner 214 is able to scan the EM radiation within a first direction of a particular FOV (e.g., an image-generation FOV or a terrain-mapping FOV) while the second MEMS scanner 218 is able to scan the EM radiation within a second direction of the particular FOV. Stated alternatively, MEMS scanners may be caused to rotate about their respective axis to angularly encode the first spectral bandwidth within an image-generation FOV and furthermore to angularly encode the second spectral bandwidth within a terrain-mapping FOV. As used herein, the term "angularly encode" may refer generally to one or more techniques that involves precisely controlling an angle of incidence which light strikes and/or is reflected from a scanning plate. By scanning a FOV, the device 100 can generate, store and utilize data that maps a terrain of a real-world environment in three dimensions.

In some implementations, one MEMS scanner in the pair is operated to perform a fast scan, while the other is operated to perform a slow scan. The fast scan MEMS scanner may sweep back and forth horizontally across the particular FOV while the slow scan MEMS scanner indexes up or down the particular FOV by one or two lines (e.g., of pixels). Such systems may be termed progressive scan systems in which the beams of EM radiation may be scanned unidirectionally or bidirectionally depending upon the desired resolution, frame rate, and scanner capabilities. In some implementations, the fast scan MEMS scanner may operate at a rate that is relatively high as compared to a video frame rate with which the CG images are refreshed while the slow scan MEMS scanner operates at a scan rate equal to the video frame rate.

Various actuation technologies for the MEMS scanners may be utilized depending on the needs of a particular implementation. Exemplary actuation technologies include, but are not limited to, electrocapacitive drive scanners, magnetic drive scanners, piezoelectric drive scanners, or any other suitable actuation technology.

Figure 3:
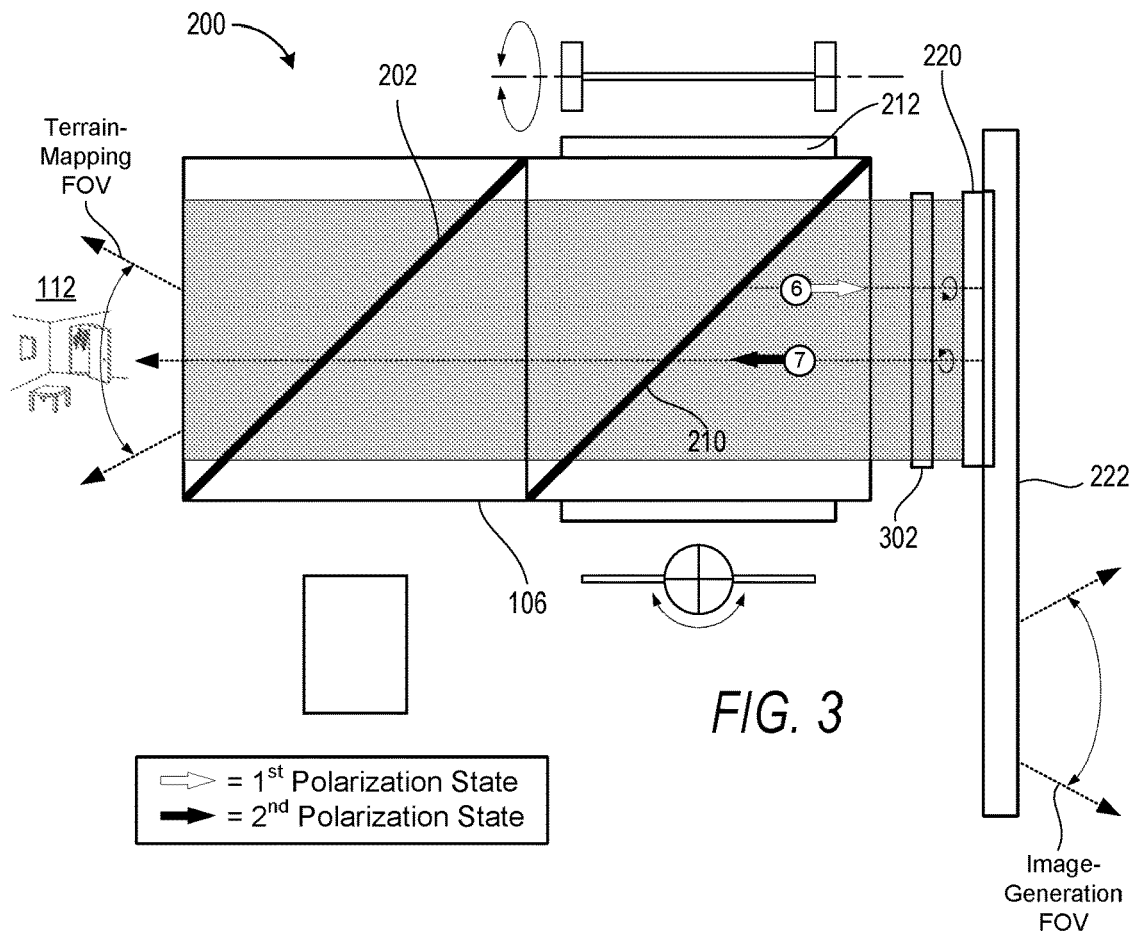
FIG. 3 illustrates an exemplary embodiment of the optical system selectively directing a particular spectral bandwidth, of the multiple spectral bandwidths, from the common optical path onto a terrain-mapping optical path to irradiate an object within a real-world environment.

Turning now to FIG. 3, the exemplary embodiment of the optical system 200 is shown to selectively direct the second spectral bandwidth from the common optical path onto a terrain-mapping optical path to irradiate the object 110 within the real-world environment 112. In particular, FIG. 3 illustrates the sixth optical path segment (e.g., the last optical path segment of the common optical path) in addition to a seventh optical path segment that is specific to the second spectral bandwidth (i.e., the first spectral bandwidth does not propagate along the seventh optical path segment illustrated in FIG. 3).

In the illustrated example, the second spectral bandwidth propagates along the sixth optical path segment from the PBS 210 toward an optical component(s) 220 that is configured to separate the first spectral bandwidth from the second spectral bandwidth. In the illustrated example, the optical component 220 is a "wavelength selective" reflector (e.g., dielectric mirror) that is configured to transmit the first spectral bandwidth and to reflect the second spectral bandwidth. The optical assembly 106 may further include a third wave plate 302 that is configured to alter a polarization state of at least the second spectral bandwidth of the EM radiation. For example, the third wave plate 302 may be a "wavelength selective" wave plate that alters a polarization state of the second spectral bandwidth without altering a polarization state of the first spectral bandwidth. Accordingly, at least with respect to the second spectral bandwidth, the third wave plate 302 may be configured similarly to the first wave plate 212 such that two passes through the third wave plate 302 causes the second spectral bandwidth to change from the first polarization state that is reflected by the PBS 210 to the second polarization state that is transmitted through the PBS 210. Therefore, after being reflected by the "wavelength selective" reflector 220 and passing through the third wave plate 302, the second spectral bandwidth is transmitted through the PBS 210 and the PBS 202 before ultimately being emitted from the optical assembly 106 into the real-world environment 112 to irradiate the object 110 for object tracking and/or terrain-mapping purposes. Ultimately, surfaces of a terrain or an object 110 in the terrain reflects a portion of the second spectral bandwidth back toward the optical system 200 and, more particularly, the sensor 108 which generates object data indicating one or more features of the terrain or characteristics of the object 110 within the terrain (e.g., a distance of the object 110 from the optical system 102, etc.)

Figure 4:
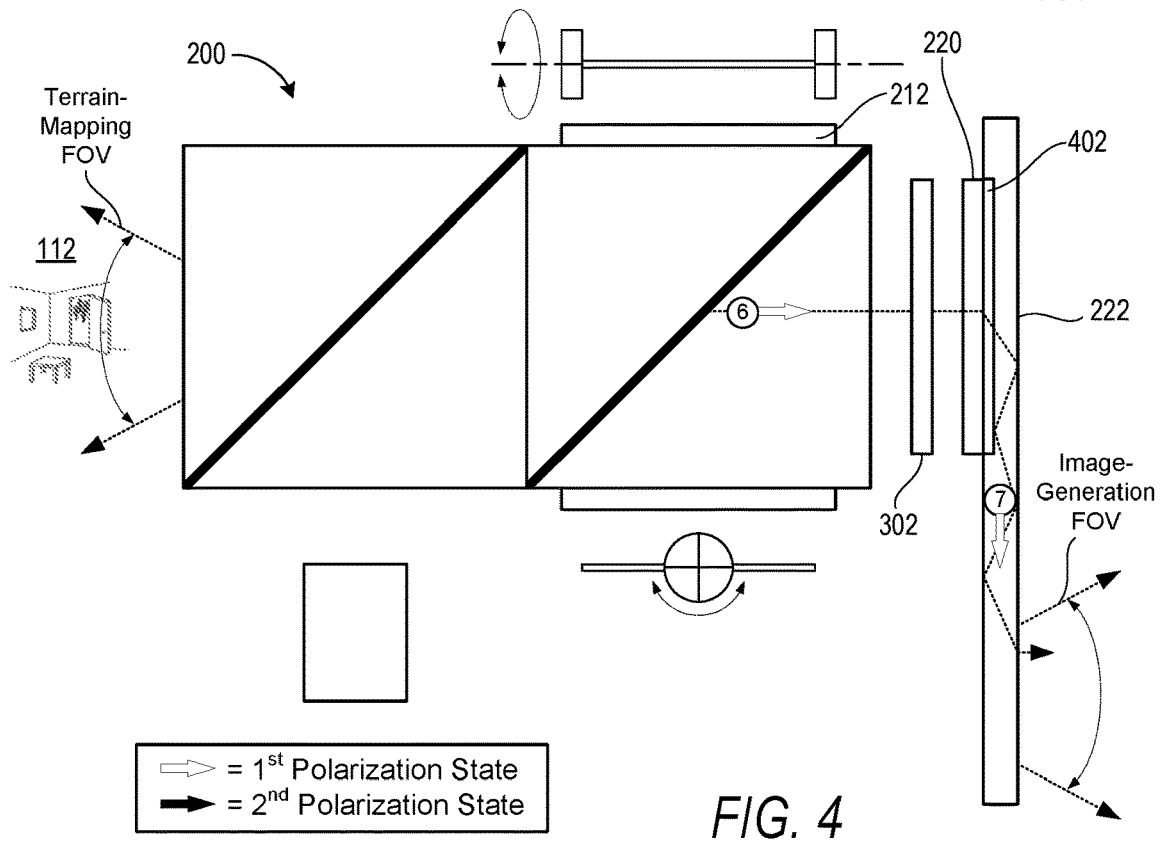
FIG. 4 illustrates an exemplary embodiment of the optical system selectively directing a different spectral bandwidth, of the multiple spectral bandwidths, from the common optical path onto an image-generation optical path to generate CG images that are visually perceptible to a user.

Turning now to FIG. 4, the exemplary embodiment of the optical system 200 is shown to selectively direct the first spectral bandwidth from the common optical path onto an image-generation optical path within the display 222 to generate CG images that are perceptible to a user. In particular, FIG. 4 illustrates the sixth optical path segment in addition to a seventh optical path segment that is specific to the first spectral bandwidth (i.e., the second spectral bandwidth does not propagate along the seventh optical path segment illustrated in FIG. 4).

In the illustrated example, the first spectral bandwidth propagates along the sixth optical path segment from the PBS 210 through the third wave plate 302 and the optical component 220 and, ultimately, into an in-coupling diffractive optical element (DOE) 402 that is configured to in-couple light into the display 222. The display 222 may be a see-through waveguide display that includes various DOEs to provide in-coupling, exit pupil expansion in one or two directions, and out-coupling. An exemplary see-through waveguide display may include the in-coupling DOE 402, an out-coupling DOE, and left and right intermediate DOEs that couple light between the in-coupling DOE 402 and the out-coupling DOE. The in-coupling DOE 402 is configured to couple the first spectral bandwidth, which may comprise one or more beams of visible light emitted by the illumination engine 104. The intermediate DOEs expand the exit pupil in a first direction along a first coordinate axis, and the out-coupling DOE expands the exit pupil in a second direction along a second coordinate axis and further couples the first spectral bandwidth out of the waveguide to the user's eye(s).

The foregoing description of the exemplary see-through waveguide display that includes the in-coupling, left and right intermediate, and out-coupling DOEs is for illustrative purposes only in the context of the optical system 200 being implemented within the NED device 100. It should be appreciated that the image-generation optical path that is specific to the first spectral bandwidth may propagate from the optical assembly 106 into any other type of suitable display which may or may not be transparent. For example, in some implementations the optical system 200 may be deployed in the context of a virtual reality NED device in which the user is unable to simultaneously view the real-world environment 112 in addition to CG images being generated with the first spectral bandwidth. It can be appreciated that while the foregoing describes the inventive concepts disclosed herein with respect to diffractive optical elements of a waveguide display, reflective waveguide displays may also be used to deploy the techniques disclosed herein. It can further be appreciated that numerous inventive concepts disclosed herein can be deployed within a wide variety of display devices (e.g., Augmented Reality Devices, Virtual Reality Devices, and/or Mixed Reality Devices) that deploy MEMS scanning devices in one dimension or 2 dimensions.

Turning now to FIGS. 5A and 5B (collectively referred to herein as FIG. 5), an exemplary embodiment of an optical system 500 is illustrated that includes an illumination engine 502 having a plurality of light sources 504 in addition to the sensor 108. FIG. 5A illustrates a plurality of optical path segments along which the second spectral bandwidth may propagate from a particular light source toward the object 110 within the real-world environment 112. FIG. 5B illustrates a plurality of optical path segments along which the reflected-portion of the second spectral bandwidth may propagate from the object 110 back into the optical system 500 and, ultimately, to the sensor 108 that is housed within the illumination engine 502.

In some embodiments, the illumination engine 502 may include one or more first light sources 504(1) that are configured to generate visible light within the first spectral bandwidth and at least one second light source 504(2) that is configured to generate light within the second spectral bandwidth. For example, the one or more first light sources 504(1) may include a red-light source, a green-light source, and a blue-light source and the second light source 504(2) may include an infrared (IR) light source. The individual light sources may include light emitting diodes (LEDs), organic LEDs, liquid crystal on silicon (LCOS) devices, lasers, laser diodes, or any other suitable light source.

In some embodiments, the illumination engine 502 includes a housing that at least partially encloses the one or more first light sources 504(1) in addition to the at least one second light source 504(2). For example, the illumination engine 502 may include a plastic housing having one or more features that can be used to mount the illumination engine 502 within the optical system 500 so that sources of both visible light and IR light can be simultaneously mounted within and/or removed from the optical system 500. In some embodiments, the housing may further enclose the sensor 108 so that the reflected-portion of the second spectral bandwidth propagates along substantially all of the terrain-mapping optical path and the common optical path (albeit in the reverse direction from when the second spectral bandwidth was emitted from the optical system 500) prior to reaching the sensor 108 that is housed within the illumination engine 502.

In some embodiments, the sensor 108 may be configured to both emit EM radiation (e.g., by generating the first spectral bandwidth and/or second spectral bandwidth in response to electrical input signals) in addition to sensing EM radiation (e.g., by generating electrical output signals in response to absorbing the second spectral bandwidth). For example, the sensor 108 may include a molybdenite ($MoS_2$) based diode that can emit light and also absorb light to produce electric signals. Accordingly, as used herein, generic references to an "illumination engine" may refer to a single component that is configured to produce the first spectral bandwidth and/or second spectral bandwidth of light. Such an "illumination engine" may further be configured to generate object data based on a reflected-portion of the first spectral bandwidth and/or second spectral bandwidth. In one example, the illumination engine include (and/or consist of) a red-light source, a green-light source, and a blue-light source that collectively emit light within the first spectral bandwidth, and another light source that is configured to both emit and sense light within the second spectral bandwidth.

With respect to the specific optical path illustrated in FIG. 5A, the second light source 504(2) emits EM radiation (also referred to herein as "light") within the second spectral bandwidth (e.g., IR-light or any other wavelength of light suitable for object tracking and/or terrain-mapping purposes) along the first optical path segment toward the first PBS 202 which reflects at least a portion of the emitted light that is in a first polarization state. For example, the second light source 504(2) may be specifically configured to emit the second spectral bandwidth in the first polarization state in which case substantially all of the emitted light will be reflected by the PBS 202. In the illustrated example, the second PBS 210 is also configured to reflect light that is in the first polarization state and transmit light that is in the second polarization state. Accordingly, the second PBS 210 reflects the light from the second optical path segment onto the third optical path segment on which the light propagates through a first wave plate 212 before impinging upon a first MEMS scanner 214. The first MEMS scanner 214 rotates about a first rotational-axis 224 to precisely control the direction that specific beams of light propagate along the fourth optical path segment.

As illustrated, after having passed through the first wave plate 212 in each direction, the light is converted from the first polarization state to the second polarization state such that the PBS 210 transmits the light toward the second wave plate 216 and the second MEMS scanner 218. The second MEMS scanner 218 rotates about a second rotational-axis 226 to precisely control the direction that the specific beams of the light propagate along a fifth optical path segment. Furthermore, after having passed through the second wave plate 216 in each direction, the polarization state of the light is converted back into the first polarization state. The PBS 210 therefore reflects the light from the fifth optical path segment onto the sixth optical path segment towards a third wave plate 302 and a reflector 506 that reflects at least the second spectral bandwidth of light. For example, the reflector 506 may be a dielectric mirror that is configured to transmit the first spectral bandwidth of light while reflecting the second spectral bandwidth of light from the sixth optical path segment onto the seventh optical path segment toward the object 110.

With respect to the specific optical path illustrated in FIG. 5B, upon being irradiated with the second spectral bandwidth of light that is emitted from the optical system 500, the object 110 reflects at least a portion of the second spectral bandwidth of light back towards the optical system 500. In the illustrated example, this "reflected-portion" reenters the optical system 500 and propagates along a plurality of optical path segments that correspond to but are opposite to the optical path segments discussed with relation to FIG. 5A. More specifically, the object 110 reflects the reflected-portion of light from the seventh optical path segment onto an eighth optical path segment. In some embodiments, the optical system 500 includes a bandpass filter 508 to prevent light that is outside of the second spectral bandwidth from entering the optical system 500. As illustrated, the reflected-portion of light at least partially retains the second polarization state and is therefore transmitted through the first PBS 202 and the second PBS 210 and, ultimately, through the third wave plate 302 before impinging upon the reflector 506. The reflector 506 then reflects the reflected-portion of light from the eighth optical path onto a ninth optical path back towards the PBS 210. After having passed through the third wave plate 302 in each direction, the reflected-portion of light is converted from the second polarization state back into the first polarization state and, therefore, is reflected by the PBS 210 from the ninth optical path segment onto a tenth optical path segment back towards the second wave plate 216 and second MEMS scanner 218.

The second MEMS scanner 218 may rotate about the second rotational-axis 226 to control the direction with which the reflected-portion of light is reflected by the second MEMS scanner 218 onto an eleventh optical path segment. After having passed through the second wave plate 216 in each direction, the reflected-portion of light is converted back into the second polarization state and, therefore, is transmitted through the PBS 210 toward the first wave plate 212 and the first MEMS scanner 214. The first MEMS scanner 214 may rotate about the first rotational-axis 224 to control the direction with which the reflected-portion of light is reflected by the first MEMS scanner 214 onto a twelfth optical path segment. After having passed through the first wave plate 212 in each direction, the reflected-portion of light is converted back into the first polarization state and, therefore, is reflected by the PBS 210 from the twelfth optical path segment onto a thirteenth optical path segment back towards the first PBS 202. Finally, in some implementations, the first PBS 202 reflects the reflected-portion of light from the thirteenth optical path segment onto a fourteenth optical path toward a nonpolarizing beam splitter 509 which then reflects the at least some of this light toward the sensor 108. In various implementations, the nonpolarizing beam splitter 509 may be partially transmissive and partially reflective so that a portion of incident light passes through the nonpolarizing beam splitter 509 while another portion of incident light is reflected by the nonpolarizing beam splitter 509. As a specific but nonlimiting example, the nonpolarizing beam splitter 509 may be in the range of ten ("10") percent to fifty ("50") percent transmissive. In this way, in implementations in which one or more of the light sources 504 are positioned relative to the first PBS 202 as shown in FIG. 5A, then a portion of the emitted-light will pass through the nonpolarizing beam splitter 509 through the optical assembly and, ultimately, out into the real-world environment 112. In some embodiments, the nonpolarizing beam splitter 509 may include a nonpolarizing coating that is color selective to reflect light within a particular range, e.g., only reflective in the IR, and to transmit light outside of this particular range.

In some implementations, the reflected-portion of light that is reflected from the object 110 within the real-world environment 112 propagates all the way back to the illumination engine 502 that houses both the first light sources 504(1) that emit light within the first spectral bandwidth, the second light source 504(2) that emits the light within the second spectral bandwidth, and the sensor 108 that detects the reflected-portion of the second spectral bandwidth and generates object data based thereon.

Additionally or alternatively, the sensor 108 may be positioned at a forward facing side (i.e., the left side as illustrated) of the optical assembly 500 to receive light from the real-world environment 112 directly, without that light having to propagate through the optical path segments described. For example, the sensor 108 may be positioned adjacent to a forward facing outer surface of the NED device 100 to detect light of the second spectral bandwidth that is received from the real-world environment 112. It can be appreciated that such configurations may be more susceptible to multipath interference and, therefore, that in such configurations appropriate hardware and/or software design features may be implemented to mitigate multipath interference.

Turning now to FIG. 6, an exemplary embodiment of an optical system 600 is illustrated that includes a single MEMS scanner 602 that is configured to rotate about two different rotational-axes to scan light within two directions of a field-of-view. In the optical system 600, the illumination engine 502 is positioned with respect to optical assembly 604 to emit light directly onto the fourth optical path segment described in relation to FIGS. 2B and 5A. The single MEMS scanner 602 includes a reflector plate 606 that is coupled to a first MEMS actuator 608 that is configured to rotate about a first rotational-axis as well as a second MEMS actuator 610 that is configured to rotate about a second rotational-axis.

In various implementations, the optical system 600 may be configured to perform terrain mapping by projecting a predetermined pattern of light (e.g., lines, grids and/or bars of light) into a terrain of the real-world environment via the terrain-mapping FOV. Then, based on the way that the known pattern of light deforms when striking surfaces of the terrain, the optical system can calculate other data defining depth and/or other surface features of objects stricken by the structured light. For example, the optical system may include a sensor 612 that is offset from the optical axis along which the structured light patterns are emitted, e.g., the seventh optical path segment. The offset between the sensor 612 and the seventh optical path segment is configured to exacerbate deformations in the structured light patterns that are reflected back to a sensor. It can be appreciated that the degree to which the structured light pattern deforms may be based on a known displacement between the source of the structured light and a sensor that detects reflections of the structured light.

In some implementations, the optical system 600 may be configured to perform terrain mapping (which may include but is not limited to object tracking) based on a stereo vision protocol. In various implementations, the stereo vision protocol may be performed by emitting light from the optical assembly 604 onto a terrain of a real-world environment and then receiving a reflected-portion of the light at a sensor that is located external to the optical assembly and/or the illumination engine 502. For example, in the illustrated embodiment the sensor 612 is located external to both the optical assembly 604 and the illumination engine 502.

In various implementations, the sensor 612 may be a CMoS camera sensor, a photodiode, or a CCD sensor, or any other suitable sensor type. In some implementations, the sensor 612 may include a filter element that is configured to block light outside of a particular spectral bandwidth and to transmit light within a different spectral bandwidth.

Turning now to FIG. 7, an exemplary embodiment is illustrated of an optical system 700 that includes one or more lenses 702 configured to modulate a size of a terrain-mapping FOV. In the illustrated example, the optical system 700 includes a convex lens 702(1) disposed between the first PBS 202 and a concave lens 702(2) in order to increase the terrain-mapping FOV. For example, the FOV with which the second spectral bandwidth of light can be emitted into and received back from the real-world environment 112 may be increased by the inclusion of the convex lens 702(1) and the concave lens 702(2) within the system 700. In some implementations, the one or more lenses 702 that are configured to expand the terrain-mapping FOV can include refractive components and/or diffractive components. In some implementations, the one or more lenses may be centered with an optical axis of the optical system 700 and/or may be located off-axis from the optical axis of the optical system 700. In some examples, the one or more lenses 702 may be configured to redirect the second spectral bandwidth of EM radiation as it exits and/or reenters the optical system 700. For example, the one or more lenses 702 may include one or more prisms and/or other diffractive components to redirect an angle with which the second spectral bandwidth propagates out of and/or into the optical system 700. In some embodiments, the one or more lenses 702 may include one or more beam expanders to reduce a beam aperture size while increasing a field of view (e.g., according to Lagrange Invariant Principles). It can be appreciated that to suit packaging design constraints the one or more beam expanders can, in various implementations, be refractive, diffractive, axis-centered, and/or off-axis.

Turning now to FIG. 8, an exemplary embodiment is illustrated of an optical system 800 that includes a terrain-mapping optical path that passes through a waveguide display 222. In particular, in the illustrated example, the EM radiation propagates along the sixth optical path segment from the second PBS 210 toward the in-coupling DOE 402. Then, the first spectral bandwidth is in-coupled into the waveguide display 222 and caused to propagate along an image-generation optical path before the first spectral bandwidth is ultimately out-coupled toward the user's eye. However, the second spectral bandwidth passes through the in-coupling DOE 402 into one or more optical elements 802 (e.g., prisms, or any other suitable optical element) that redirect the second spectral bandwidth toward the object 110. Although the illustrated embodiment shows the second spectral bandwidth passing through the waveguide display 222 twice prior to being emitted towards the object 110 in the real-world environment 112, in some embodiments the second spectral bandwidth passes through the waveguide display 222 only once or not at all prior to being emitted towards the object 110.

Turning now to FIG. 9, an exemplary embodiment is illustrated of an optical system 900 that includes a terrain-mapping optical path that internally propagates through at least one waveguide display prior to being emitted towards the object 110. In the illustrated embodiment, the optical system 900 includes a first waveguide display 902(1) that operates as a waveguide display as discussed in relation to FIG. 4 as well as a second waveguide display 902(2) that operates to emit the second spectral bandwidth of EM radiation toward the object 110 within the real-world environment 112. For example, each of the first waveguide 902(1) and the second waveguide 902(2) may be transparent waveguide displays through which a user is able to view the real-world environment 112. Furthermore, first waveguide display 902(1) may include one or more DOEs for in-coupling the first spectral bandwidth, expanding an exit pupil of the first spectral bandwidth to form the CG images, and ultimately out-coupling the first spectral bandwidth toward the user's eye. Accordingly, it can be appreciated that the optical path segment labeled seven and that is illustrated to propagate internally through the first waveguide display 902(1) corresponds to an image-generation optical path as described herein. In the illustrated example, the first waveguide display 902(1) includes the in-coupling DOE 402 described in relation to FIG. 4.

The second waveguide display 902(2) may include one or more DOEs for in-coupling the second spectral bandwidth, causing the second spectral bandwidth to propagate internally through at least a portion of the second waveguide display 902(2), and ultimately out-coupling the second spectral bandwidth towards the object 110. Accordingly, it can be appreciated that the optical path segment labeled seven and that is illustrated to propagate internally through the second waveguide display 902(2) corresponds to a terrain-mapping optical path as described herein. In the illustrated example, the second waveguide display 902(2) includes an in-coupling DOE 904 that is configured to in-couple the second spectral bandwidth into the second waveguide display 902(2) while allowing the first spectral bandwidth to pass through the second waveguide display 902(2) into the in-coupling DOE 402 that in-couples the first spectral bandwidth into the first waveguide display 902(1).

Although the illustrated example shows the second spectral bandwidth being emitted away from the user toward the object 110 within the real-world environment 112, in some embodiments the optical system 900 (or for that matter other exemplary embodiments described herein) may emit the second spectral bandwidth toward one or more body parts (e.g., an eye and/or hand) of the user for object tracking purposes. For example, as illustrated FIG. 9, the second spectral bandwidth (or a third spectral bandwidth for that matter in embodiments configured to perform three discrete functionalities such as, for example, tracking objects in front of the user, tracking the user's eyes, and generating CG images) may alternatively and/or additionally propagate along the tenth optical path segment toward the user's eye to track an orientation of the user's eye with respect to the optical system 900 (e.g., to track an eye-gaze direction of the user). As another example, the optical system 900 may emit the second spectral bandwidth toward the user's hands to track one or more movements such as, for example, hand gestures that may be interpreted as system commands. As indicated by the return arrow shown on each the ninth optical path segment and the tenth optical path segment, the reflected-portion of light may re-propagate along at least a portion of the described optical paths prior to reaching the sensor.

Although the illustrated example shows the first spectral bandwidth and the second spectral bandwidth being internally propagated through separate waveguides, in some embodiments the optical system 900 causes both the first spectral bandwidth and the second spectral bandwidth to internally propagate through a single waveguide. For example, in some embodiments the first waveguide display 902(1) may include DOEs that are configured to in-couple both the first spectral bandwidth and the second spectral bandwidth. Then, both of the first spectral bandwidth and the second spectral bandwidth may propagate towards one or more out-coupling DOEs to out-couple the first spectral bandwidth towards the user's eye and furthermore to out-couple the second spectral bandwidth toward the object (which in some instances may be the user's eye).

In some embodiments, an NED device may include two or more discrete optical systems as described herein. For example, an exemplary NED device may include a first optical system to generate a first CG image in front of a user's left eye and a second optical system to generate a second CG image (which may be identical to the first CG image or different than the first CG image) in front of a user's right eye. In such embodiments, individual ones of the discrete optical systems may be configured to perform different terrain-mapping functions. For example, an exemplary NED device may deploy the first optical system to generate the first image in front of the user's left eye and also to emit light outward into the real-world environment 112 to track one or more objects that are distant (e.g., greater than 3 feet, greater than 10 feet, greater than 50 feet, or any other suitable distance) from the NED device. The exemplary NED device may simultaneously deploy the second optical system to generate the second image in front of the user's right eye and also to emit light outward into the real-world environment to track hand gestures of the user that occur close to the NED device.

In some implementations, an NED device may be configured to separate three or more spectral bandwidths from a common optical path for three or more discrete purposes. For example, an NED device may emit a visible spectral bandwidth and two different IR spectral bandwidths along a common optical path of an optical assembly. Then, the optical assembly may be configured to separate a first IR bandwidth as shown in FIG. 5A so that the first IR bandwidth is reflected back through the optical assembly by a wavelength selective reflector (e.g. 506) while allowing a second IR bandwidth and the visible spectral bandwidth through the wavelength selective reflector into one or more waveguides. The optical assembly may be further configured to separate the second IR bandwidth and the visible spectral bandwidth as described in relation to FIG. 9 wherein the visible spectral bandwidth propagates through the first waveguide 902(1) to generate images whereas the second IR bandwidth propagates through the second waveguide 902(2) and, ultimately, along the tenth optical path segment to track the user's eye. Various techniques that can be deployed in combination with the optical systems of the present disclosure are described in more detail in U.S. Pat. No. 9,377,623 to Robbins et. al entitled "Waveguide Eye Tracking Employing Volume Bragg Grating" and dated Jun. 28, 2016.

In some implementations, the system may be configured to analyze object data that is generated based on a reflected-portion of the second spectral bandwidth to develop a depth map of the object and/or other aspects of the real-world environment 112. For example, the structured light pattern may include a grid of IR light "dots" that are emitted onto and ultimately reflected by the object back to the system. The system may then analyze object data based on the reflected IR light "dots" to determine a distance of each individual "dot" from the system. These distances may then be compiled into a depth map. In some implementations, the system may be configured to increase the resolution of the depth map by combining object data that is received based on a plurality of different structured light patterns. For example, in an implementation where a structured light pattern includes the grid of IR light "dots," it can be appreciated that the resolution of a resulting depth map is limited by the number of IR light "dots" emitted. It can further be appreciated that individual IR light "dots" must be sufficiently spaced within the real-world environment to enable the system to discern between the corresponding reflected-portions of light. Accordingly, the system may be configured to emit different structured light patterns to dynamically vary the structured light patterns emitted to increase the number of depth-points on a particular tract object that can be identified and added to the depth map. For example, the system may be configured to cause the at least one MEMS scanner to direct the second spectral bandwidth to emit a plurality of different light patterns onto the object. Then, the system may increase the resolution of a depth map by combining object data corresponding to individual ones of the structured light patterns.

Example Clauses

The disclosure presented herein may be considered in view of the following clauses.

Example Clause A, an optical system, comprising: at least one controller for modulating output signals corresponding to image data defining computer-generated (CG) images, the at least one controller configured for processing tracking data associated with a terrain-mapping protocol for identifying features of a terrain of a real-world environment surrounding the optical system; an illumination engine to generate electromagnetic (EM) radiation in response to the output signals, wherein the EM radiation includes a first spectral bandwidth for generating the CG images and a second spectral bandwidth for deploying the terrain-mapping protocol; an optical assembly for receiving the EM radiation from the illumination engine and to cause the first spectral bandwidth and the second spectral bandwidth to propagate along a common optical path, wherein the optical assembly directs the first spectral bandwidth from the common optical path onto an image-generation optical path to generate the CG images, and wherein the optical assembly directs the second spectral bandwidth from the common optical path onto a terrain-mapping optical path to irradiate the terrain; at least one micro electro mechanical system (MEMS) scanner configured to angularly encode the EM radiation based on the output signals, wherein the output signals cause the at least one MEMS scanner to angularly encode the first spectral bandwidth within an image-generation field-of-view (FOV) to generate the CG images, and wherein the output signals cause the at least one MEMS scanner to angularly encode the second spectral bandwidth within a terrain-mapping FOV to at least partially illuminate the terrain; and a sensor for receiving a reflected-portion of the second spectral bandwidth that is reflected from the terrain of the real-world environment, the sensor generating object data based on the reflected-portion of the second spectral bandwidth, the object data indicating the features of the terrain.

Example Clause B, the optical system of Example Clause A, wherein the optical assembly causes the reflected-portion of the second spectral bandwidth to reverse-propagate along at least one segment of the terrain-mapping optical path, and wherein the optical assembly redirects the reflected-portion from the terrain-mapping optical path to the sensor along at least one segment of the common optical path.

Example Clause C, the optical system of any of Example Clauses A through B, wherein the terrain-mapping protocol causes the at least one MEMS scanner to angularly encode the second spectral bandwidth to emit at least one structured light pattern, and wherein the features of the terrain are determined based on the reflected-portion indicating at least one deformation of the at least one structured light pattern that is caused by a known displacement of the sensor from a source of the second spectral bandwidth, and wherein the sensor is external from the illumination engine.

Example Clause D, the optical system of any of Example Clauses A through C, wherein the optical assembly includes a wavelength selective reflector that is configured to separate the first spectral bandwidth from the second spectral bandwidth at a boundary between the common optical path and the image-generation optical path.

Example Clause E, the optical system of Example Clause D, wherein the wavelength selective reflector is configured to transmit the first spectral bandwidth into an in-coupling diffractive optical element (DOE) of a waveguide display, and wherein the second spectral bandwidth passes through a waveplate a first time while propagating toward the wavelength selective reflector, and wherein the wavelength selective reflector is configured to reflect the second spectral bandwidth through the waveplate a second time to enable the second spectral bandwidth to pass through a polarizing beam splitter (PBS) toward the terrain.

Example Clause F, the optical system of any of Example Clauses A through E, wherein the illumination engine includes a plurality of first light sources that are configured to generate visible light within the first spectral bandwidth and at least one second light source that is configured to generate at least one of infrared light or ultraviolet light within the second spectral bandwidth.

Example Clause G, the optical system of any of Example Clauses A through F, wherein the terrain-mapping protocol is a time-of-flight protocol for identifying a distance of at least one object of the terrain from the optical system, and wherein the optical assembly irradiates the at least one object with the second spectral bandwidth via the common optical path and the terrain-mapping optical path substantially contemporaneously with generating the CG images via the common optical path and the image-generation optical path.

Example Clause H, the optical system of any of Example Clauses A through G, wherein the terrain-mapping protocol is a stereo vision protocol associated with receiving the reflected-portion of the second spectral bandwidth that is reflected from the terrain of the real-world environment, and wherein the sensor is external from the illumination engine.

Example Clause I, a Near-Eye-Display (NED) device, comprising: an illumination engine to generate electromagnetic (EM) radiation that includes at least a first spectral bandwidth for generating CG images via a display and a second spectral bandwidth for irradiating a terrain of a real-world environment to track one or more features of the terrain; an optical assembly positioned to receive the EM radiation from the illumination engine, wherein the optical assembly is configured to transmit the first spectral bandwidth into the display to generate the CG images and the second spectral bandwidth into the real-world environment to irradiate the one or more features; at least one micro electro mechanical system (MEMS) scanner configured to angularly encode the EM radiation within the optical assembly, wherein the at least one MEMS scanner is configured to scan the first spectral bandwidth within an image-generation field-of-view (FOV) to generate the CG images via the display, and wherein the at least one MEMS scanner is configured to scan the second spectral bandwidth within a terrain-mapping FOV to irradiate the one or more features; and a sensor to generate, based on a reflected-portion of the second spectral bandwidth that is reflected by the one or more features, object data that indicates at least one of a depth of the one or more features or an orientation and relative position of the one or more features.

Example Clause J, the NED device of Example Clause I, wherein the optical assembly comprises: a polarizing beam splitter (PBS) disposed adjacent to the display, the PBS configured to reflect a first polarization state of the EM radiation and transmit a second polarization state of the EM radiation, wherein the first polarization state is orthogonal to the second polarization state; a first waveplate disposed between the PBS and the at least one MEMS scanner, wherein the EM radiation propagates through the PBS toward the first waveplate in the second polarization state and is transmitted through the first waveplate toward the at least one MEMS scanner, and wherein the EM radiation propagates from the first waveplate to the PBS in the first polarization state and is reflected by the PBS toward the display; a wavelength selective reflector disposed between the display and the PBS, the wavelength selective reflector configured to transmit the first spectral bandwidth into the display and to reflect the second spectral bandwidth back toward the PBS; and a second waveplate disposed between the PBS and the wavelength selective reflector, wherein the second spectral bandwidth propagates from the second waveplate to the PBS in the second polarization state and is transmitted through the PBS to irradiate the one or more features within the real-world environment.

Example Clause K, the NED device of any of Example Clauses I through J, wherein the optical assembly comprises a wavelength selective reflector that is positioned along a common optical path of the optical assembly, the wavelength selective reflector to transmit the first spectral bandwidth from the common optical path to an image-generation optical path and to reflect the second spectral bandwidth from the common optical path to a terrain-mapping optical path.

Example Clause L, the NED device of Example Clause K, wherein the optical assembly further includes at least one bandpass filter that is positioned to selectively transmit the reflected-portion of the second spectral bandwidth to the sensor.

Example Clause M, the NED device of any of Example Clauses I through L, wherein the optical assembly is configured to transmit the second spectral bandwidth through one or more diffractive optical elements (DOEs) to irradiate an eye of a user with the spectral bandwidth, and wherein the object data indicates an orientation and position of the eye.

Example Clause N, the NED device of any of Example Clauses I through M, wherein the illumination engine includes at least one first light source to generate visible light within the first spectral bandwidth and at least one second light source to generate infrared light within the second spectral bandwidth.

Example Clause O, the NED device of Example Clause O, wherein the illumination engine includes a housing that at least partially encloses: the at least one first light source to generate the visible light, the at least one second light source to generate the infrared light, and the sensor to generate the object data.

Example Clause P, the NED device of Example Clause J, wherein the first waveplate is configured to alter polarization of the first spectral bandwidth and the second spectral bandwidth, and wherein the second waveplate is configured at least to alter polarization of the second spectral bandwidth.

Example Clause Q, the NED device of any of Example Clauses I through P, further comprising: a first channel that is configured to deploy a first optical assembly for terrain-mapping of the real-world environment; and a second channel that is configured to deploy a second optical assembly for hand-gesture tracking.

Example Clause R, an optical system comprising: a waveguide display comprising one or more optical elements for directing at least a visible-light spectral bandwidth within the waveguide display; at least one illumination engine to generate electromagnetic (EM) radiation that includes at least the visible-light spectral bandwidth for generating CG images via the waveguide display and an infrared-light spectral bandwidth for irradiating a terrain within a real-world environment, wherein the at least one illumination engine generates object data based on a reflected-portion of the infrared-light spectral bandwidth that is reflected by the terrain; an optical assembly positioned to receive the EM radiation from the at least one illumination engine, the optical assembly positioned to transmit the visible-light spectral bandwidth into the waveguide display to generate the CG images and the infrared-light spectral bandwidth into the real-world environment to irradiate the terrain; at least one micro electro mechanical system (MEMS) scanner disposed to angularly encode the EM radiation within the optical assembly to direct the visible-light spectral bandwidth within an image-generation field-of-view (FOV) and the infrared-light spectral bandwidth within a terrain-mapping FOV; and at least one controller that is communicatively coupled to the at least one illumination engine, the at least one MEMS scanner, and the sensor, wherein the at least one controller is configured to: cause the at least one MEMS scanner to direct the visible-light spectral bandwidth with respect to the optical assembly to transmit the visible-light spectral bandwidth through the one or more optical elements to generate the CG images through the waveguide display; cause the at least one MEMS scanner to direct the infrared-light spectral bandwidth with respect to the optical assembly to emit at least one structured light pattern onto the terrain; and monitor the object data that is generated by the sensor to determine at least one of a depth a feature of the terrain or an orientation of the feature of the terrain.

Example Clause S, the optical system of Example Clause R, wherein the at least one controller is configured to: cause the at least one MEMS scanner to direct the infrared-light spectral bandwidth with respect to the optical assembly to emit a plurality of different structured light patterns onto the terrain, the plurality of different structured light patterns including at least a first structured light pattern emitted at a first time and a second structured light pattern emitted at a second time; increase a resolution of at least one depth map by combining at least: first object data that is generated by the sensor based on the first structured light pattern, and second object data that is generated by the sensor based on the second structured light pattern.

Example Clause T, the optical system of any of Example Clauses R through S, wherein the optical assembly is configured to transmit the infrared-light spectral bandwidth into at least one of the first waveguide display or a second waveguide display to irradiate the terrain.

Example Clause U, the optical system of any of Example Clauses R through T, wherein an object within the real-world environment includes at least one body part of a user, wherein the MEMS scanner causes the infrared-light spectral bandwidth to emit a plurality of different structured light patterns onto the object, and wherein monitoring the object data further comprises determining a depth the object or an orientation of the object.

Example Clause V, the optical system of any of Example Clauses R through U, further comprising: a first channel that is configured to emit the infrared-light spectral bandwidth within the terrain-mapping FOV to implement a terrain-mapping protocol; and a second channel that is configured to emit the infrared-light spectral bandwidth within another FOV to implement a hand-gesture tracking protocol.

Example Clause W, the optical system of any of Example Clauses R through V, wherein the at least one controller is further configured to: determine a depth of the feature from the optical assembly to an object within the real-world environment; detect one or more changes to a position of the feature within the terrain-mapping FOV; and based on at least one of the depth or the one or more changes, generate data indicating an orientation of a head of a user of the optical system.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. An optical system, comprising:
   at least one illumination engine to generate electromagnetic (EM) radiation in response to output signals that are generated by a controller, wherein the EM radiation includes a first bandwidth for rendering Computer-Generated (CG) images and a second bandwidth for implementing an object tracking protocol;
   an optical assembly to direct the first bandwidth onto an image-generation optical path to generate the CG images and to concurrently direct the second bandwidth onto an object-tracking optical path to irradiate at least one object within a real-world environment; and
   a sensor for receiving a reflected-portion of the second bandwidth that is reflected from the at least one object, the sensor generating object data based on the reflected-portion of the second bandwidth, the object data indicating the characteristics of the at least one object.

2. The optical system of claim 1, further comprising at least one controller that is configured to:
   receive image data defining the computer-generated (CG) images;
   receive tracking data defining the object tracking protocol; and
   modulate the output signals based on the image data and the tracking data.

3. The optical system of claim 1, wherein the optical assembly includes a wavelength selective reflector that separates the first bandwidth from the second bandwidth at a boundary between a common optical path and the image-generation optical path.

4. The optical system of claim 1, wherein the illumination engine includes a plurality of first light sources that are configured to generate visible light within the first bandwidth and at least one second light source that is configured to generate infrared light within the second bandwidth.

5. The optical system of claim 1, wherein the image-generation optical path directs the first bandwidth of the EM radiation into a display.

6. The optical system of claim 5, wherein the display is a waveguide display that includes a plurality of in-coupling optical elements and a plurality of out-coupling optical elements.

7. The optical system of claim 1, further comprising at least one micro electro mechanical system (MEMS) scanner configured to scan within at least a first direction and a second direction, and wherein the MEMS scanner reflects both of the first bandwidth for rendering Computer-Generated (CG) images and the second bandwidth for implementing an object tracking protocol into the optical assembly.

8. The optical system of claim 1, further comprising a wavelength selective reflector to transmit the first bandwidth into an in-coupling diffractive optical element (DOE) of a waveguide display.

9. The optical system of claim 8, wherein the wavelength selective reflector is configured to reflect the second bandwidth through a waveplate to enable the second bandwidth to pass through a polarizing beam splitter (PBS) toward the at least one object.

10. A Near-Eye-Display (NED) device, comprising:
    at least one first light source to generate a first bandwidth of EM radiation for rendering Computer-Generated (CG) images via a display;
    at least one second light source to generate a second bandwidth of EM radiation for implementing an object tracking protocol;
    an optical assembly to direct the first bandwidth of EM radiation onto an image-generation optical path to generate the CG images via the display and to concurrently direct the second bandwidth of EM radiation onto an object-tracking optical path to irradiate at least one object within a real-world environment;
    a sensor to generate object tracking data based on a reflected-portion of the second bandwidth of EM radiation that is reflected from the at least one object back to the sensor, the object data indicating the characteristics of the at least one object with respect to the NED device; and
    a terrain-mapping engine to analyze the object tracking data to determine the characteristics of the at least one object with respect to the NED device.

11. The NED device of claim 10, wherein both of the first bandwidth of EM radiation and the second bandwidth of EM radiation initially enter the optical assembly along a common optical path.

12. The NED device of claim 10, wherein the optical assembly separates the first bandwidth of EM radiation from the second bandwidth of EM radiation based on the first bandwidth of EM radiation having a different polarization state than the second bandwidth of EM radiation.

13. The NED device of claim 10, wherein the optical assembly includes at least one polarizing beam splitter (PBS) to separate the first bandwidth of EM radiation from the second bandwidth of EM radiation.

14. The NED device of claim 10, wherein the at least one first light source to generate a first bandwidth of EM radiation and the at least one second light source to generate a second bandwidth of EM radiation are commonly installed within an illumination engine.

15. The NED device of claim 14, wherein the sensor is further installed within the illumination engine.

16. The NED device of claim 10, wherein the optical assembly comprises:
   a polarizing beam splitter (PBS) to reflect a first polarization state of EM radiation and transmit a second polarization state of EM radiation;
   a first waveplate disposed between the PBS and at least one MEMS scanner, wherein the EM radiation propagates through the PBS toward the first waveplate in the second polarization state and is transmitted through the first waveplate toward the at least one MEMS scanner, and wherein the EM radiation propagates from the first waveplate to the PBS in the first polarization state and is reflected by the PBS toward the display;
   a wavelength selective reflector disposed between the display and the PBS, the wavelength selective reflector configured to transmit the first bandwidth into the display and to reflect the second bandwidth back toward the PBS; and
   a second waveplate disposed between the PBS and the wavelength selective reflector, wherein the second bandwidth propagates from the second waveplate to the PBS in the second polarization state and is transmitted through the PBS to irradiate the object within the real-world environment.

17. An optical system comprising:
   a display comprising one or more optical elements for directing at least a visible-light bandwidth to generate CG images;
   at least one illumination engine to generate electromagnetic (EM) radiation that includes at least the visible-light bandwidth for generating CG images via the waveguide display and an invisible-light bandwidth for irradiating an object within a real-world environment;
   an optical assembly positioned to receive the EM radiation from the at least one illumination engine, the optical assembly positioned to transmit the visible-light bandwidth into the waveguide display to generate the CG images and the infrared-light bandwidth into the real-world environment to irradiate the object;
   a sensor to generate object tracking data based on a reflected-portion of the invisible-light bandwidth; and
   a terrain-mapping engine to map at least some objects within the real-world environment with respect to the NED device based on the object tracking data.

18. The optical system of claim 17, wherein both of the visible-light bandwidth and the invisible-light bandwidth propagate through at least a portion of the optical assembly along a common optical path.

19. The optical system of claim 17, wherein the illumination engine includes a plurality of first light sources to generate the visible-light bandwidth and at least one second light source to generate the invisible-light bandwidth.

20. The optical system of claim 17, wherein the sensor is a component of the illumination engine.

* * * * *